(12) United States Patent
Colodny et al.

(10) Patent No.: US 11,170,341 B2
(45) Date of Patent: *Nov. 9, 2021

(54) SYSTEM, METHOD, AND APPARATUS FOR LOCATING AND MERGING DOCUMENTS

(71) Applicant: Chargerback, Inc., Carson City, NV (US)

(72) Inventors: Brian Colodny, Reno, NV (US); Michael McLaughlin, Gardnerville, NV (US)

(73) Assignee: Chargerback, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,624

(22) Filed: Nov. 18, 2019

(65) Prior Publication Data
US 2020/0090115 A1 Mar. 19, 2020

Related U.S. Application Data

(63) Continuation of application No. 15/382,267, filed on Dec. 16, 2016, now Pat. No. 10,482,422, which is a continuation-in-part of application No. 14/158,658, filed on Jan. 17, 2014, now Pat. No. 9,626,645.

(60) Provisional application No. 62/369,629, filed on Aug. 1, 2016.

(51) Int. Cl.
*G06Q 10/08* (2012.01)
(52) U.S. Cl.
CPC .......... *G06Q 10/087* (2013.01); *G06Q 10/08* (2013.01)

(58) Field of Classification Search
CPC ..... G06Q 10/087; G06Q 10/08; G06F 16/951
USPC .................. 707/758, 749, 707, 999.003, 722
See application file for complete search history.

(56) References Cited

U.S. PATENT DOCUMENTS

| | | | |
|---|---|---|---|
| 5,955,952 A | 9/1999 | Bergman |
| 6,259,367 B1 | 7/2001 | Klein |
| 6,449,611 B1 | 9/2002 | Frankel |
| 6,466,983 B1 | 10/2002 | Strazza |
| 6,604,087 B1 | 8/2003 | Kolls |
| 6,609,106 B1 | 8/2003 | Robertson |
| 7,242,279 B2 | 7/2007 | Wolfe |
| 7,290,288 B2 | 10/2007 | Gregg |
| 7,318,069 B2 | 1/2008 | Takahashi et al. |

(Continued)

OTHER PUBLICATIONS

Office Action for U.S. Appl. No. 15/476,971, dated Dec. 12, 2019.
(Continued)

*Primary Examiner* — Dung K Chau

(57) ABSTRACT

In one embodiment, a system, method, and apparatus to generate a merged record comprises a client server configured to generate a first report; and a recovery server configured to: receive the first report, the first report including first report information including at least one first descriptive term and a customer ID; match the at least one first descriptive term to one of a plurality of descriptive terms in a descriptive term list; determine if a weighted percentage associated with the matched at least one first descriptive term is greater than a predetermined weighted percent; match the at least one first descriptive term to at least one second descriptive term in at least one second report if it is determined that the weighted percentage associated with the matched at least one first descriptive term is greater than the predetermined weighted percent.

20 Claims, 25 Drawing Sheets

(56) References Cited

U.S. PATENT DOCUMENTS

| | | | |
|---|---|---|---|
| 7,379,978 B2* | 5/2008 | Anderson | G06Q 20/00 709/219 |
| 7,424,473 B2 | 9/2008 | Orion, III et al. | |
| 7,653,553 B2 | 1/2010 | Das | |
| 7,885,999 B2 | 2/2011 | St. Marie | |
| 7,912,842 B1* | 3/2011 | Bayliss | G06F 16/215 707/749 |
| 8,370,062 B1 | 2/2013 | Starenky | |
| 8,370,168 B1 | 2/2013 | Jenkins et al. | |
| 8,577,689 B1 | 11/2013 | Czarnetzky | |
| 8,973,813 B2 | 3/2015 | Penny | |
| 9,367,527 B2* | 6/2016 | Colodny | G06F 40/134 |
| 9,408,072 B2 | 8/2016 | Bombolowsky | |
| 9,626,645 B2 | 4/2017 | Colodny | |
| 9,665,913 B2 | 5/2017 | Loutit | |
| 10,521,802 B2 | 12/2019 | Colondy et al. | |
| 2002/0072924 A1 | 6/2002 | Gray | |
| 2002/0178041 A1 | 11/2002 | Krantz et al. | |
| 2003/0036950 A1 | 2/2003 | Nguyen | |
| 2003/0065595 A1 | 4/2003 | Anglum | |
| 2004/0002998 A1 | 1/2004 | Takahashi et al. | |
| 2004/0019609 A1 | 1/2004 | Orton et al. | |
| 2004/0035644 A1 | 2/2004 | Ford | |
| 2004/0049396 A1 | 3/2004 | Hope | |
| 2004/0124239 A1 | 7/2004 | Feld | |
| 2004/0153413 A1 | 8/2004 | Gross | |
| 2004/0172335 A1 | 9/2004 | Batoff | |
| 2005/0033615 A1 | 2/2005 | Nguyen et al. | |
| 2005/0171932 A1* | 8/2005 | Nandhra | G06F 16/951 |
| 2006/0201447 A1 | 9/2006 | Meadows | |
| 2007/0011017 A1 | 1/2007 | Field | |
| 2007/0088569 A1 | 4/2007 | Berkelhamer et al. | |
| 2007/0109126 A1 | 5/2007 | House | |
| 2007/0138272 A1 | 6/2007 | Saperstein | |
| 2007/0138273 A1 | 6/2007 | Saperstein | |
| 2007/0138274 A1 | 6/2007 | Saperstein | |
| 2007/0156677 A1 | 7/2007 | Szabo | |
| 2007/0226086 A1 | 9/2007 | Bauman | |
| 2008/0035722 A1 | 2/2008 | Feld | |
| 2008/0059256 A1 | 3/2008 | Lynch | |
| 2008/0079581 A1 | 4/2008 | Price | |
| 2008/0129488 A1 | 6/2008 | Hill | |
| 2008/0301281 A1* | 12/2008 | Wang | H04L 63/1416 709/224 |
| 2009/0013060 A1 | 1/2009 | St. Marie | |
| 2009/0187433 A1 | 7/2009 | Nudd | |
| 2009/0230191 A1 | 9/2009 | Saperstein | |
| 2009/0287498 A2 | 11/2009 | Choi | |
| 2009/0319561 A1 | 12/2009 | Hosp et al. | |
| 2010/0035220 A1 | 2/2010 | Herz et al. | |
| 2010/0223245 A1 | 9/2010 | Vermilye | |
| 2010/0332356 A1 | 12/2010 | Spolar | |
| 2011/0061018 A1 | 3/2011 | Piratla et al. | |
| 2011/0167125 A1 | 7/2011 | Achlioptas | |
| 2011/0234399 A1 | 9/2011 | Yan | |
| 2012/0059661 A1 | 3/2012 | Colodny | |
| 2012/0059693 A1 | 3/2012 | Colodny et al. | |
| 2012/0066008 A1 | 3/2012 | Scudder | |
| 2012/0084165 A1 | 4/2012 | Shigeki | |
| 2012/0267430 A1 | 10/2012 | Penny | |
| 2013/0212042 A1 | 8/2013 | Rosenberg | |
| 2013/0284804 A1 | 10/2013 | Saywa | |
| 2014/0095274 A1* | 4/2014 | McLaughlin | G06Q 10/083 705/14.1 |
| 2014/0281857 A1 | 9/2014 | Colodny | |
| 2014/0327518 A1 | 11/2014 | Loutt | |
| 2015/0205835 A1 | 7/2015 | McLaughlin | |
| 2016/0275442 A1 | 9/2016 | Colodny | |
| 2016/0300238 A1 | 10/2016 | Colodny | |
| 2017/0206244 A1 | 7/2017 | Colondy et al. | |
| 2017/0221162 A1 | 8/2017 | Colondy et al. | |

OTHER PUBLICATIONS

Final Office Action for U.S. Appl. No. 16/254,530, dated Jan. 8, 2020.
Office Action for U.S. Appl. No. 16/687,621, dated Mar. 6, 2020.
Office Action for U.S. Appl. No. 13/224,247, dated Jun. 21, 2013.
Office Action for U.S. Appl. No. 13/224,244, dated Jun. 27, 2013.
U.S. Appl. No. 13/631,456, filed Sep. 28, 2012.
U.S. Appl. No. 13/842,768, filed Mar. 15, 2013.
Final Office Action for U.S. Appl. No. 13/224,247, dated Oct. 7, 2013.
Amazon "Checkout by Amazon", https://payments.amazon.com/sdui/sdui/business/cba#features, Apr. 1, 2010.
Stamps "USPS Shipping at Your Fingertips", http://www.stamps.com/welcom/, Aug. 26, 2010.
Final Office Action for U.S. Appl. No. 13/224,244, dated Jan. 8, 2014.
Final Office Action for U.S. Appl. No. 13/224,247, dated Jun. 17, 2014.
Office Action for U.S. Appl. No. 13/631,456, dated Jun. 17, 2014.
Office Action for U.S. Appl. No. 13/631,456, dated Oct. 6, 2014.
Office Action for U.S. Appl. No. 13/224,247, dated Oct. 7, 2014.
Office Action for U.S. Appl. No. 13/631,456, dated Feb. 11, 2015.
Office Action for U.S. Appl. No. 13/842,768, dated Jul. 29, 2015.
Final OA for U.S. Appl. No. 13/224,247 dated Sep. 1, 2011.
Office Action for U.S. Appl. No. 13/631,456 dated Dec. 7, 2015.
Final Office Action for U.S. Appl. No. 13/842,768, dated Dec. 9, 2015.
Notice of Allowance for U.S. Appl. No. 13/842,768, dated Mar. 16, 2016.
Office Action for U.S. Appl. No. 14/158,658 dated Apr. 6, 2016.
Office Action for U.S. Appl. No. 13/224,247 dated Apr. 21, 2016.
Office Action for U.S. Appl. No. 13/631,456 dated May 6, 2016.
FulcrumTech, How to Create an Effective Call-to-Action; 10 Tips to Help Drive Conversions to your Email Campaign, www.fulcrumtech.net/resources/how-to-create-an-effective-call-to-action/, Jun. 2010.
Final Office Action for U.S. Appl. No. 14/497,095, dated Sep. 25, 2016.
Merriam Webster Dictionary "Coupon", http://merriam-webster.com/dictionary/coupon, Sep. 4, 2006.
Final Office Action for U.S. Appl. No. 13/224,247, mailed Sep. 23, 2016.
Notice of Allowance for U.S. Appl. No. 14/158,658, dated Oct. 20, 2016.
Office Action for U.S. Appl. No. 13/224,244, dated Dec. 14, 2016.
Office Action for U.S. Appl. No. 13/224,247, dated May 9, 2017.
Final Office Action for U.S. Appl. No. 13/224,244, dated May 24, 2017.
Office Action for U.S. Appl. No. 15/181,187, dated Jun. 16, 2017.
Office Action for U.S. Appl. No. 15/170,098, dated Jun. 30, 2017.
Office Action for U.S. Appl. No. 13/631,456, dated Aug. 11, 2017.
Office Action for U.S. Appl. No. 14/497,095, dated Aug. 25, 2017.
Office Action for U.S. Appl. No. 13/224,244, dated Aug. 31, 2017.
Final Office Action for U.S. Appl. No. 13/224,247, dated Sep. 28, 2017.
Final Office Action for U.S. Appl. No. 13/224,244, dated Jan. 16, 2018.
Final Office Action for U.S. Appl. No. 15/170,098, dated Feb. 7, 2018.
Final Office Action for U.S. Appl. No. 15/181,187, dated Mar. 5, 2018.
Final Office Action for U.S. Appl. No. 13/631,456 dated Mar. 8, 2018.
Office Action for U.S. Appl. No. 15/181,187, dated Nov. 21, 2018.
Final Office Action for U.S. Appl. No. 15/170,098, dated Dec. 31, 2018.
MS Shift, "Command and Control Your Hotel: Lost & Found—Admin User's Guide," www.msshift.com, © 2009.
MS Shift, "Command and Control Your Hotel: Lost & Found—User's Guide," www.msshift.com, © 2008.
"Command and Control your Hotel with MS Shift Hotel Security Systems" brochure, www.msshift.com, © 2008.
Notice of Intent to Issue Ex Parte Reexamination Certificate, U.S. Appl. No. 90/014,004, dated Aug. 14, 2018.

(56) References Cited

OTHER PUBLICATIONS

Office Action in Ex Parte Reexamination Certificate, U.S. Appl. No. 90/014,004, dated May 1, 2018.
Decision on Petition under 37 CFR 1.515 and 1.81, U.S. Appl. No. 90/014,004, dated Jan. 17, 2018.
Order Denying Request for Ex Parte Examination, U.S. Appl. No. 90/014,004, dated Aug. 14, 2018.
Request for Ex Parte Examination, U.S. Appl. No. 90/014,004, dated Aug. 25, 2017.
Order Denying Request for Ex Parte Examination, U.S. Appl. No. 90/014,004, dated Oct. 18, 2017.
Final Office Action for U.S. Appl. No. 15/181,187, dated Apr. 3, 2019.
Office Action for U.S. Appl. No. 15/382,267, dated Apr. 4, 2019.
Office Action for U.S. Appl. No. 16/254,530, dated Sep. 18, 2019.
Notice of Allowance for U.S. Appl. No. 15/170,098, dated Sep. 25, 2019.
S.E. Robertson Simple, proven approaches to text retrival, 1994, University Cambridge Computer Laboratory.
Gerard Salton, Term Weighting Approaches in Automatic Text Retrieval, Cornell Uniersity Department of Computer Science.
Weiwei Cui, TextFlow, Towards better understanding of evolving topics in text, 2011, IEEE Transactions on Visualization and Computer graphics.
Notice of Allowance for U.S. Appl. No. 15/488,377, dated Oct. 9, 2019.
Office Action for U.S. Appl. No. 16/254,530, dated May 1, 2020.
Notice of Allowance for U.S. Appl. No. 16/687,621, dated May 14, 2020.
Office Action for U.S. Appl. No. 16/690,068, dated Jul. 23, 2020.
Final Office Action for U.S. Appl. No. 15/476,971, dated Jul. 24, 2020.
U.S. Appl. No. 16/254,530 NPL-EIC 3600 Search Report (Year: 2020).
Final Office Action for U.S. Appl. No. 16/254,530, dated Oct. 5, 2020.
Office Action for U.S. Appl. No. 16/690,068, dated Dec. 10, 2020.

* cited by examiner

User Information

Business Name: Las Vegas Demonstration Account
Type of Business: Airline
Street: 1 Las Vegas Blvd
City: Las Vegas
State: Nevada     Zip Code: 89128

Contact Info

Contact Name: Brian Colodny
Phone: 775-690-4388
Email: brian@chargerback.com

Advanced Options

Passwords: Click Here To Manage Passwords And Users
Auto Notify: ☑ brian@chargerback.com;7756904380@
3rd Party Ship: ☑ Enable Third Party
     3rd Party Ship Surcharge: 10
Auto Purge Data: ☐ Purge Guest Data After 90 Days
Days To Hold: 15  Days to store item on site
Disallow Delete Item: ☐ Partial Users - Disallow Delete Function
Custom Drop Down Box: Click Here To Customize A Drop Down Box — 602
Allow Tansfers: ☑
Kiosk Mode: ☑ Reporting lost items will be used in a public space

[Update Information]

SYSTEM, METHOD, AND APPARATUS FOR LOCATING AND MERGING DOCUMENTS

CROSS-REFERENCE TO RELATED APPLICATIONS

This application is a continuation of U.S. application Ser. No. 15/382,267, filed Dec. 16, 2016 and entitled "SYSTEM, METHOD AND APPARATUS FOR LOCATING AND MERGING DOCUMENTS," which is hereby incorporated herein by reference, which in turn is a continuation-in-part of U.S. application Ser. No. 14/158,658, filed Jan. 17, 2014 and entitled "SYSTEM, METHOD, AND APPARATUS FOR LOCATING AND MERGING DOCUMENTS," which is hereby incorporated herein by reference. The prior U.S. application Ser. No. 15/382,267 also claims priority benefit to U.S. Provisional Application No. 62/369,629 filed Aug. 1, 2016 and entitled "SYSTEM, METHOD, AND APPARATUS FOR LOCATING AND MERGING DOCUMENTS," which is hereby incorporated herein by reference.

FIELD OF THE INVENTION

The present disclosure relates generally to merging data fields. More particularly, the present disclosure relates to locating and merging data fields in lost and found records.

BACKGROUND OF THE INVENTION

Everyone has forgotten a personal item at least once. Once lost, the items may or may not ever be returned to the rightful owner. For example, when on vacation, a user may forget an item(s) in a hotel room. In another example, a customer may forget an item in a rental car, sporting event, or any other establishment or event. The most common item left in hotel rooms is chargers, such as a cell phone charger. However, any other valuable items may also be lost or left behind such as clothing, cell phones, jewelry, and the like.

When reporting the lost item, the user or customer or the establishment may submit a lost report. Then when the item is found, the establishment and/or the finder may submit a found report. However, to determine whether the lost report matches the found report requires a person to manually compare the information between the two records to determine if the found item matches the lost item.

Overview

The invention is directed to a system, method, and apparatus for locating and merging data fields based on matching keywords and/or codes having a high weighted percentage in lost and found records, reports, or documents. Each lost and/or found record or report may have a plurality of data fields such as customer identification, description information, and any other desired data. Initially, keywords are weighted based on use in previous lost and found records, reports, or documents. The keywords are stored in the data fields and are matched with terms in another lost and found records, reports, or documents. If there is a match found with keywords above a preset or predetermined weighted percentage of use, then it is displayed on a display.

To locate and determine potential data fields to merge to produce a single merged record or document, the customer identification and main code of one record is matched with other customer identification and main codes other records stored in a report server. When two or more records or documents are selected to be merged, a comparison is made to determine whether there are any terms that are different in each of the data fields. If there are terms in the data fields that are different, a single record with both terms may be generated. The different terms may be set apart or presented in a different format such as in italics, bolded in a different color, on separate lines, or in any other format. If the document was later determined not to be a match or the user would like to unmerge the documents, the documents the merged terms may be deleted and the documents returned to its original format.

In one embodiment, a system to generate a merged record, comprises a client server configured to generate a first report; and a recovery server configured to: receive the first report, the first report including first report information including at least one first descriptive term and a customer ID; match the at least one first descriptive term to one of a plurality of descriptive terms in a descriptive term list; determine if a weighted percentage associated with the matched at least one first descriptive term is greater than a predetermined weighted percent; match the at least one first descriptive term to at least one second descriptive term in at least one second report if it is determined that the weighted percentage associated with the matched at least one first descriptive term is greater than the predetermined weighted percent; and display the at least one second report if the at least one first descriptive term matches the at least one second descriptive term.

In another embodiment, a method for generating a merged report, comprises receiving, at a server, a first item report, the first item report including first report information, the first report information including at least one descriptive term and a customer identification; accessing a weighted term list including a plurality of descriptive terms, each of the descriptive terms having a weighted value; selecting a subset of the plurality of descriptive items from the weighted term list based on the weighted value for the plurality of descriptive items; identifying one or more second item reports that potentially match the first item report, the identifying being based on at least in part on the plurality of descriptive items in the subset of the plurality of descriptive items and the weighted value for each of the plurality of descriptive items in the subset of the plurality of descriptive items; and subsequently presenting the identified one or more second item reports.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings:

FIGS. 6A and 6B are exemplary screenshots illustrating customization of match terms.

FIGS. 10A-10C illustrate example screenshots illustrating the matching and merging of reports.

FIGS. 12A-12H are exemplary screenshots in accordance with an embodiment of the present invention.

DESCRIPTION OF EXAMPLE EMBODIMENTS

Figure 1:
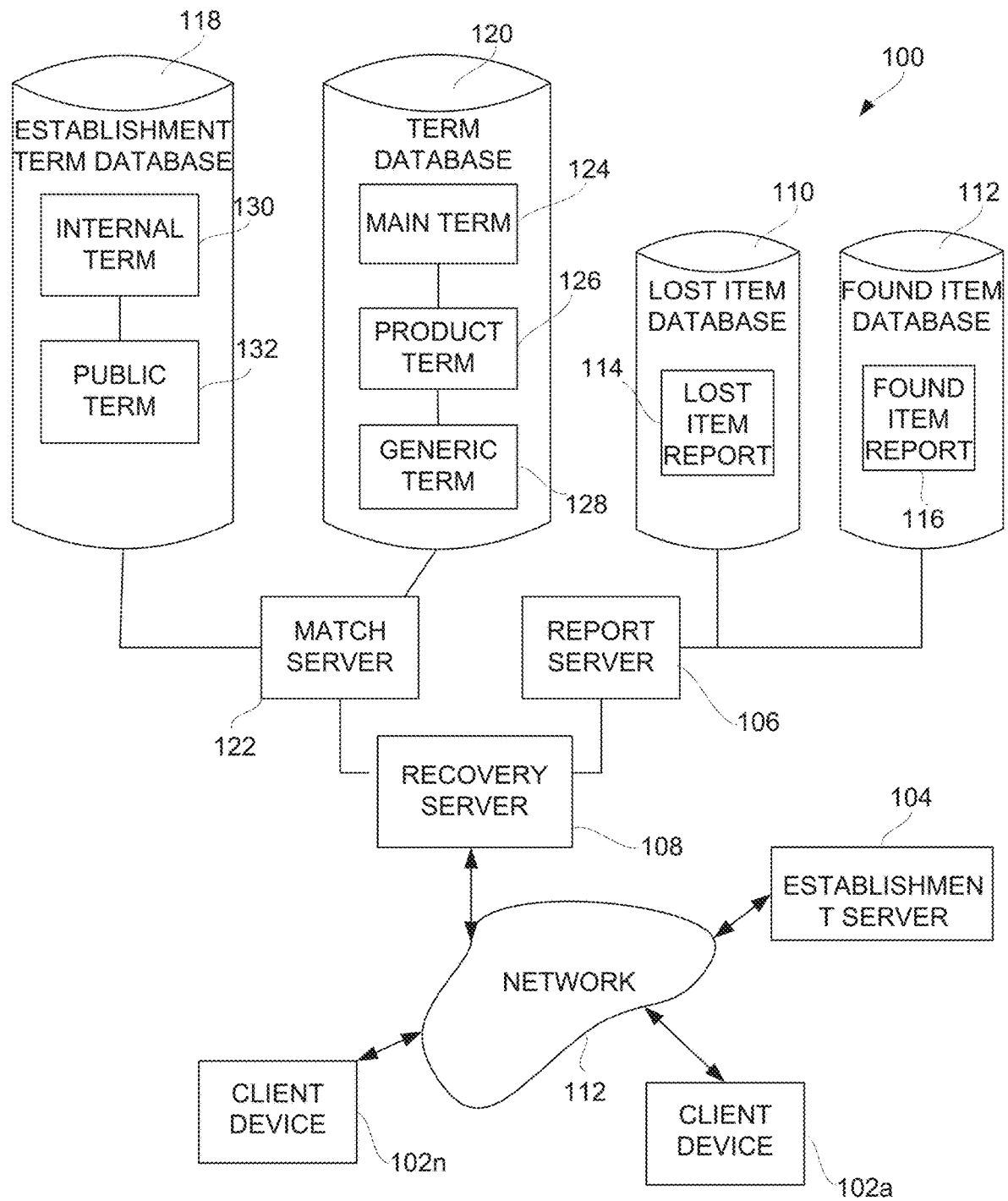
FIG. 1 illustrates an exemplary system for merging records.

Embodiments are described herein in the context of a system, method, and apparatus for locating and merging data fields of lost records with found records. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The disclosed invention is directed to a system, method, and apparatus for locating and merging data fields based on matching keywords and/or codes having a high weighted percentage of use in lost and found records or documents. Each lost and/or found record or report may have a plurality of data fields such as customer identification, description information, and any other desired data. Each lost and/or found record or report may have a plurality of data fields such as customer identification, description information, and any other desired data. Initially, keywords are weighted based on use in previous lost and found records, reports, or documents. The keywords are stored in the data fields and are matched with terms in another lost and found records, reports, or documents. If there is a match found with keywords above a preset or predetermined weighted percentage of use, then it is displayed on a display.

To locate and determine potential data fields to merge to produce a single merged record or document, the customer identification and main code of one record is matched with other customer identification and main codes other records stored in a report server. When two or more records or documents are selected to be merged, a comparison is made to determine whether there are any terms that are different in each of the data fields. If there are terms in the data fields that are different, a single record with both terms may be generated. The different terms may be set apart or presented in a different format such as in italics, bolded in a different color, on separate lines, or in any other format. If the document was later determined not to be a match or the user would like to unmerge the documents, the documents the merged terms may be deleted and the documents returned to its original format.

Several embodiments of the invention are discussed below with reference to FIGS. 1-12. However, those skilled in the art will readily appreciate that the detailed description given herein with respect to these figures is for explanatory purposes as the invention can extend beyond these limited embodiments.

Referring now to FIG. 1, an exemplary system for locating and merging records or reports. The system 100 can have a plurality of client computing devices 102a, 102n (where n is an integer) configured to communicate with a recovery server 108 via network 112 to transmit a lost item report with the hope of recovering their lost items. Client computing devices 102a-n and recovery server 108 may be connected to network 112 via any known wired or wireless manner. Client computing devices 102a-n may be any computing device such as a desktop computer, laptop, netbook, as well as any mobile computing device such as mobile (e.g., cellular) phones, media players, personal digital assistants (PDAs), and the like.

The system 100 may have an establishment server 104 configured to communicate with the recovery server 108 via network 112 to transmit lost and/or found item reports and conduct any other transactions such as receive shipping documents, authentication of the customer, and the like. The establishment server 104 may be associated with any type of business such as a hotel, supermarket, airport, airline company, coffee shop, car rental company, school (e.g. primary school, university, college, and the like), cruise ship, movie theaters, parks and campgrounds, shopping centers, business centers, private residences, or any other location where a lost item may be lost and/or found. Furthermore, the establishment server may also be an event, such as a football game, convention, seminar, and the like.

Recovery server 108 may have a report server 106. The report server 106 may have a lost item database 110 and a found item database 112. The lost item database 110 may be configured to store lost item reports 114 submitted by the client device 102a-n or the establishment server 104. The found item database 112 may be configured to store found item reports 116 transmitted from the client device 102a-n or the establishment server 104. The lost item report 114 may have a plurality of data fields storing information such as customer identification, description information, associated codes, and any other desired data. For example, the customer identification fields may include customer name, user name, password, electronic mail address, address, phone number, and any other desired customer information. In another example, the description information may include lost item description such as the location of where the item was found, detailed description of the item, such as color, shape, manufacturer, client contact information, current storage location of the lost item and other descriptive information. The location of where the item was found may include a business name, room number, seat number, and/or additional location data of where the item was located. The lost item description may also include an image of the lost item to enhance or increase the chances for identification of the lost item. In yet another example, the code data field may include any codes that are associated with the lost item report 114. As further discussed in detail below, the associated codes may be used to locate potential documents to merge.

The recovery server 108 may have a match server 122. The match server 122 may be configured to store keyword terms. The match server 122 may have a term database 120 configured to store various terms such as, for example, main terms 112, product terms 112 and generic terms 128. Those of ordinary skill in the art will now realize that the terms may be organized in any desired data structure or organization scheme that is understandable or necessary for the organization. One example embodiment will now be described. The main terms 128 may be main or high-level keyword terms to describe various products. The main terms may be a description used to describe a plurality of products. For example, and as illustrated in Table 1, main terms may include "clothing", "electronics", "sporting goods", and the like. Each main term 128 may be assigned a code or unique identifier. For example, "clothing" may be assigned code 10. Although illustrated in numerical format, the code may be any unique code or identifier consisting of text, symbols, or numbers.

TABLE 1

MAIN TERMS

|  | CODE |  | CODE |
|---|---|---|---|
| CLOTHING | 10 | SPORTING GOODS | 20 |
| ELECTRONICS | 30 | BOOKS | 40 |
| CHILDREN TOYS | 50 | ADULT TOYS | 60 |
| FURNITURE | 70 | HEALTH BEAUTY | 80 |

Each main term 124 may be associated with a plurality of product terms 126 as illustrated in Table 2. The product terms 126 may further define what the main terms 124 are. For example, under main term "clothing", the product terms 126 may include pants, shirts, dress, shoes, and the like. In another example, main term "health beauty" may include the product terms perfume, make-up, razor, soap, lipstick, and the like. Each product term 126 may be assigned a code or unique identifier. For example, "pants" may be assigned code 10-1, "shirt" may be assigned code 10-2, and the like. Although illustrated in numerical format, the code may be any unique code or identifier consisting of text, symbols, or numbers.

TABLE 2

| MAIN TERM: MAIN CODE | PRODUCT TERM | PRODUCT CODE |
|---|---|---|
| CLOTHING: 10 | PANTS | 10-1 |
|  | SHIRT | 10-2 |
|  | DRESS | 10-3 |
|  | SHOES | 10-4 |
|  | SOCKS | 10-5 |
|  | JACKET | 10-6 |

TABLE 2-continued

| MAIN TERM: MAIN CODE | PRODUCT TERM | PRODUCT CODE |
|---|---|---|
|  | HAT | 10-7 |
|  | GLOVES | 10-8 |
| HEALTH BEAUTY: 80 | PERFUME | 80-1 |
|  | MAKE-UP | 80-2 |
|  | RAZOR | 80-3 |
|  | SOAP | 80-4 |
|  | LIPSTICK | 80-5 |
|  | NAIL POLISH | 80-6 |

Each product term 126 may be associated with a plurality of generic terms 128 as illustrated in Table 3. The generic terms 128 may further define what the product terms 126 are. For example, under product term "SHOES", the generic terms 128 may include sneakers, dress, high hell, crocks, and the like. In another example, product term "health beauty" may include the generic terms concealer, foundation, mineral, powder, and the like. As such, there may be substantially more generic terms than product terms, and substantially more product terms than main terms.

Each generic term 128 may be assigned a code or unique identifier. For example, "sneakers" may be assigned code 10-4-1, "dress" may be assigned code 10-4-2, and the like. Although illustrated in numerical format, the code may be any unique code or identifier consisting of text, symbols, or numbers.

TABLE 3

| MAIN TERM: MAIN CODE | PRODUCT TERM: PRODUCT CODE | GENERIC TERM: GENERIC CODE |
|---|---|---|
| CLOTHING: 10 | SHOES: 10-4 | SNEAKER: 10-4-1 |
|  |  | DRESS: 10-4-2 |
|  |  | SANDEL: 10-4-3 |
|  |  | CROCS: 10-4-4 |
|  |  | BOOT: 10-4-5 |
|  |  | SKETCHERS: 10-4-6 |
|  |  | VANS: 10-4-7 |
|  |  | STEVE MADDEN: 10-4-8 |
| HEALTH BEAUTY: 80 | MAKE-UP: 80-2 | CONCEALER: 80-2-1 |
|  |  | FOUNDATION: 80-2-2 |
|  |  | MINERAL: 80-2-3 |
|  |  | POWER: 80-2-4 |
|  |  | CREAM: 80-2-5 |
|  |  | BRONZER: 80-2-6 |
|  |  | BLUSH: 80-2-7 |
|  |  | EYEBROW PENCIL: 80-2-8 |

In one embodiment, each of the product terms 126 and generic terms 128 may also include misspelled keywords, keywords with interchanged letters, alternative spellings, and the like. For example, generic terms 128 may include the following misspelled terms for "CROCS": "croks"; "crooks"; "krocks"; "kroks"; and any other alternative or misspelled terms. In another example, product term 126 may include the following misspelled terms for "SNEAKERS": "sneeker"; "sneker"; "sneckr"; "sneaker"; "sneaker"; and any other alternative or misspelled terms.

EXAMPLES

For exemplary purposes only and not intended to be limiting, example term databases 120 will be described. Although described with reference to different establishments, this is not intended to be limiting as the terms and/or keywords in the term database 120 may vary and may be based upon the type of establishment or desired terms of the established.

Example 1

The main terms 124 for an airport establishment may be each country the airline services. The product terms 126 may then further define each of the main terms 124. The product terms 126 may be cities or states within the country that the airline services. The generic terms 128 may include cities within each state and well as any misspellings or alternative spellings of the state, country, or city. This is further illustrated and explained in Table 4.

TABLE 4

| MAIN TERM | PRODUCT TERM | GENERIC TERM |
| --- | --- | --- |
| UNITED STATES | CALIFORNIA | SACRAMENTO |
| | CALI | SAN DIEGO |
| | SOUTHERN CALIFORNIA | LOS ANGELES |
| | NORTHERN CALIFORNIA | FRESNO |
| | KALIFORNIA | SAN JOSE |
| | KALIPHONIA | SAN FRANCICO |
| | | LAX |
| | | SJC |
| | | SFO |

Example 2

Recovery server 108 may allow the establishment to further customize its own match terms stored in an establishment term database 118. If the establishment is a hotel, the hotel's main terms may be internal terms 130 associated with a location within the hotel. For example, the internal term 130 "ZONE-1-LOBBY" may be associated with the reception area of the lobby, internal term 130 "ZONE-2-LOBBY" may be associated with the waiting are of the lobby, and internal term 130 "POOL-NW" may be associated with the Jacuzzi area of the pool.

Each internal term 130 may have a plurality of generic public terms 132 associated with each of the internal terms 130. For example, "ZONE-1-LOBBY" may be associated with generic public terms 132 "reception", "concierge", "front desk", "check-in", "receptionist", and the like. In another example, "POOL-NW" may be associated with generic public terms 132 "Jacuzzi", "hot tub", "spa", "hot-tub", and the like.

In another embodiment, recovery server 108 may allow the establishment to add, edit, or delete any existing or pre-defined match terms (e.g. the main terms, product terms, or generic terms) to further customize the match terms to the establishment's desires. For example, the establishment may want to change or customize the pre-defined match term "CLOTHING" to "WOMEN CLOTHING" and "MEN CLOTHING". In other words, the establishment may customize any existing hierarchy of match terms stored in the match server databases as further illustrated in Table 5.

TABLE 5

| INTERNAL TERM | GENERIC TERM |
| --- | --- |
| ZONE-1-LOBBY | RECEPTION |
| | CONCIERGE |
| | FRONT DESK |
| | CHECK-IN |
| | RECEPTIONIST |
| POOL-NW | JACUZZI |
| | HOT TUB |
| | SPA |
| | HOT-TUB |

Example 3

Figure 2:
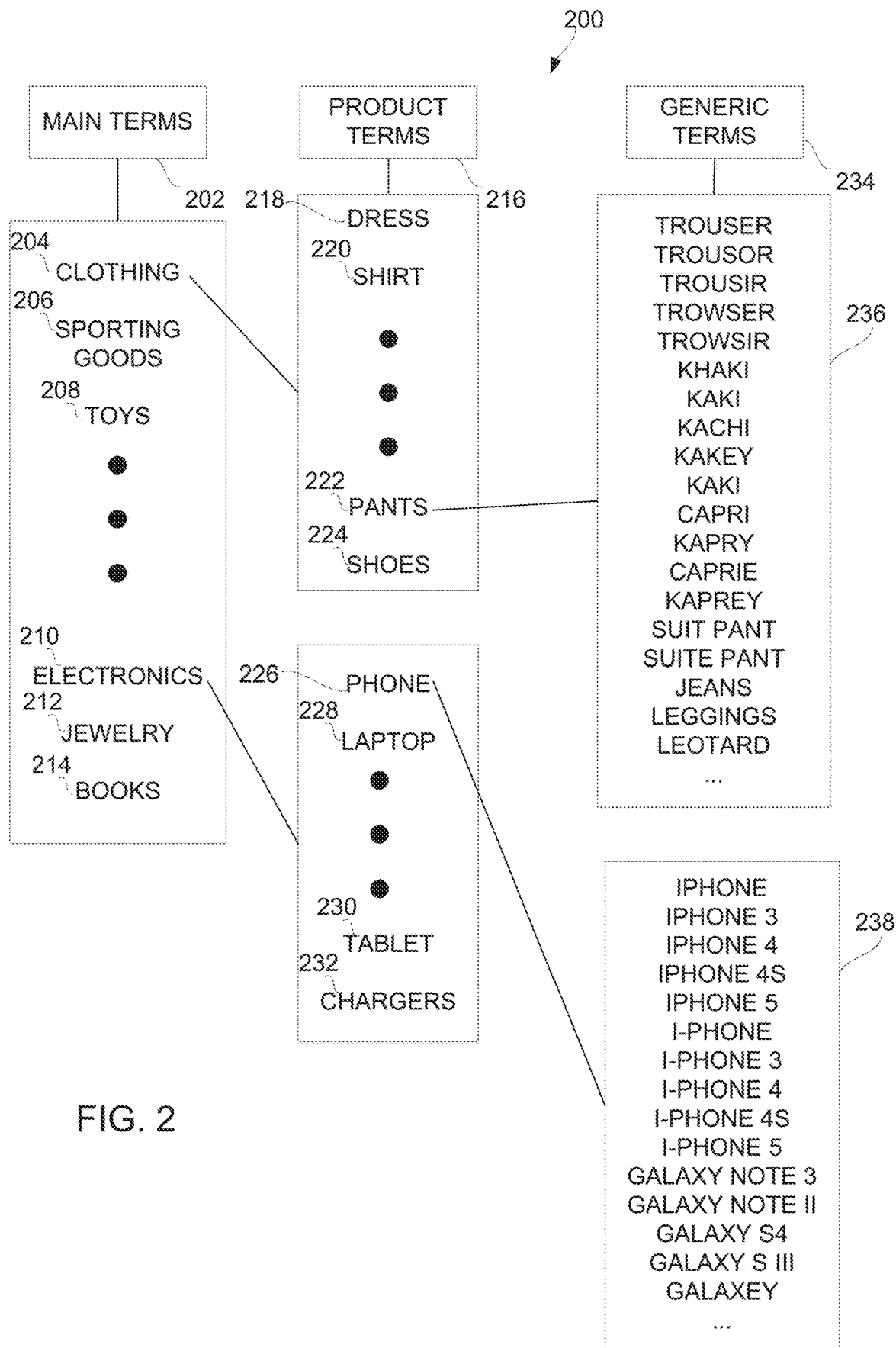
FIG. 2 illustrates an exemplary term database.

FIG. 2 illustrates another exemplary term database. The establishment may be any establishment such as a hotel, airplane, seminar, theme park, movie theatre, and the like. The term database 200 may have main terms 202, product terms 216, and generic terms 234. Main terms 202 may have keywords "CLOTHING" 204, "SPORTING GOODS" 206, "TOYS" 208, "ELECTRONICS" 210, "JEWELRY" 212, "BOOKS" 214, and the like.

Main term 202 may be associated with a plurality of product terms 216 that further define each main term 202. "CLOTHING" 204 may be associated with product terms 216 "DRESS" 218, "SHIRT" 220, "PANTS" 222, and "SHOES" 224. Main term 202 "ELECTRONICS" 210 may be associated with product terms 216 "PHONE" 226, "LAPTOP" 228, "TABLET" 230, and "CHARGERS" 232.

Product terms 216 may be associated with a plurality of generic terms 234 which further define each of the product terms 216. Product term 216 "PANTS" 222 may be associated with generic terms 236 "TROUSER", "KHAKI", "CAPRI", "JEANS", and the like. The generic terms 236 may also include alternative or misspelled keywords such as "TROUSOR", "KAKI", "KAPRY", and the like. Product term 216 "PHONE" 226 may be associated with generic terms 238 "IPHONE™", "IPHONE™ 3", "GALAXY NOTE™ 3", "GALAXY NOTE™ II" AND THE LIKE. The generic terms 236 may also include various misspelling and/or spellings of each of the generic terms 238 such as "I-PHONE™", "I-PHONE™ 3", "I-PHONE™ 4" and the like.

Referring back to FIG. 1, in one embodiment, a customer may call the establishment to report a lost or found item. The establishment server 104 may then create and transmit to the recovery server 108 a lost item report 114 or a found item report 116. In another embodiment, client device 102a-n may self-report and transmit to recovery server 108 a lost item report 114 and/or a found item report 116. The lost item report 114 may be stored in the lost item database 110 and the found item report 116 may be stored in the found item database 112.

Figure 3A:
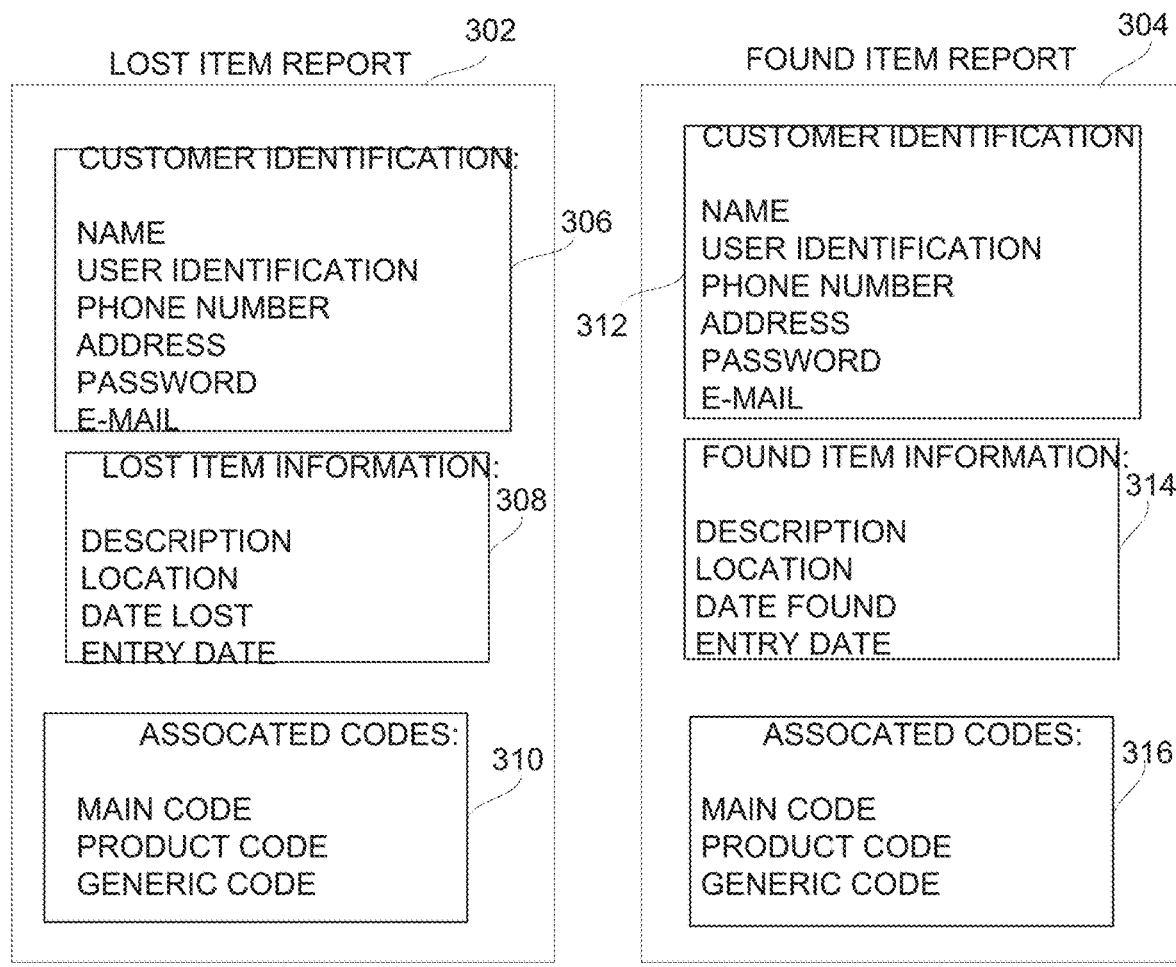
FIGS. 3A and 3B illustrate the matching and merging of data fields according to one embodiment.
Figure 3B:
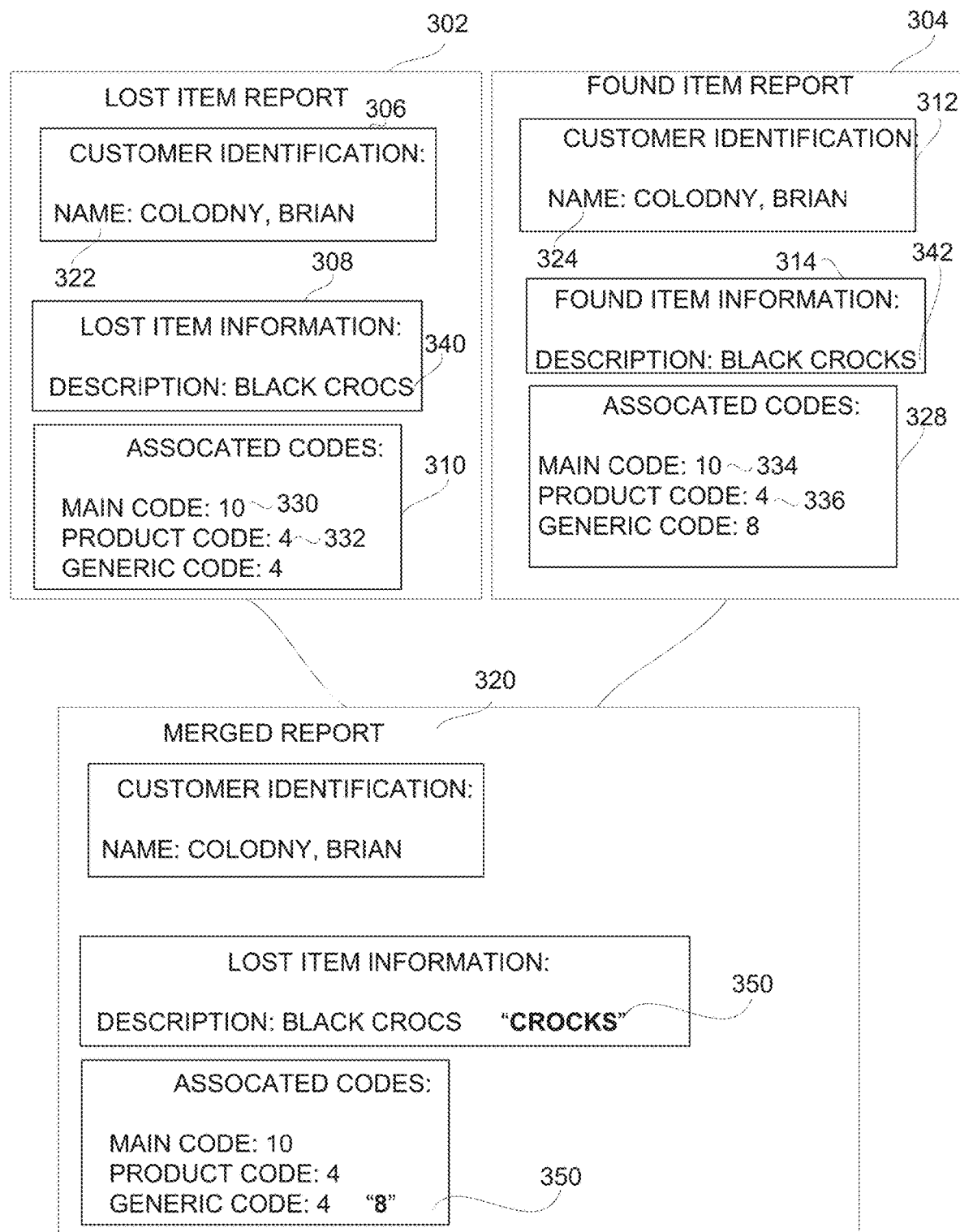

FIGS. 3A and 3B illustrate the matching and merging of data fields according to one embodiment. Referring to FIG. 3A, the lost item report 302 may have a plurality of data fields such as a customer identification data field 306, lost item information data field 308, and an associated code data field 310. Customer identification 306 may include information such as name, unique or user identification, phone number, address, password, electronic mail, or any other desired customer information. Lost item information 308 may also include descriptive information of the lost item, location of where the item was lost, date the item was lost (e.g. a business name, room number, seat number, level, and/or additional location data of where the item was found), entry date of the lost item report 302, and any other desired lost item information. Associated codes 310 may be any codes associated with the lost item report 302 based upon keywords or terms obtained from the lost item information 308.

The found item report 304 may also have a plurality of data fields similar to the lost item report 302. The found item report 304 may have a plurality of data fields such as a customer identification data field 312, found item information data field 314, and an associated code data field 316. Customer identification 312 may include information such as name, unique or user identification, phone number, address, password, electronic mail, or any other desired customer information. Found item information 314 may also include descriptive information of the found item, location of where the item was found (e.g. a business name, room number, seat number, level, and/or additional location data of where the item was found), date the item was found, entry date of the found item report 304, and any other desired lost item information. Associated codes 316 may be any codes associated with the found item report 304 based upon keywords or terms obtained from the found item information 314.

Referring now to FIG. 3B, data fields in the lost item report 302 and the found item report 304 may be compared to locate potential records, reports or documents to be merged. In one embodiment, the customer identification 306, 312 of the lost item report 302 and the found item report 304 may be compared. In another embodiment, the associated codes 310, 316 of the lost item report 302 and the found item report 304 may be compared. It will now be known that any of the data fields may be compared to locate potential documents to be merged.

As illustrated, the customer name data field may be "COLODNY, BRIAN" 322, 324 in both the lost item report 302 and the found item report 304. Additionally, the main code data field "10" 330, 334 and the product code data field "4" 332, 336 in both the lost item report 302 and the found item report 304 may be the same. If there is a match in the customer identification data fields and/or the associated code data fields, the records may be potential reports to merge.

If it is determined that the records are to be merged, the item information data field 308, 314 from both the lost item report 302 and the found item report 304 may be compared for any differences or discrepancies. As illustrated in FIG. 3B, the description data field in the lost item report 302 may be "BLACK CROKS" 340. However, the description data field in the found item report 304 may be "BLACK CROCKS" 342. Since the spellings are different, the discrepancy will be noted and included in the merged report 320.

A single combined merged report 320 may be generated by combining the data fields from each record. Although illustrated as merging two reports, this is not meant to be limiting as more than one record may be merged. For example, there may be two or more found item reports that may be merged with a single lost item report. In another embodiment, two or more lost item reports may be merged with a single found item report. Furthermore, although illustrated as merging a lost item report with a found item report, this is not intended to be limiting as two or more lost item reports may be merged. In another embodiment, two or more found item reports may be merged. In still another embodiment, the found item report may be merged with the lost item report.

The resulting merged report 320 may include information both from the lost item report 302 and the found item report 304. As illustrated, data fields from the found item report 304 information may be merged with data fields from the lost item report 302. Generally, lost item reports have more information and the information is more accurate than found item reports as customers want their lost items returned. Thus, information in the found item reports 304 may be merged or added to the lost item report 302. However, this is not intended to be limiting as the lost item report 302 information may be merged or added to found item reports 304.

The merged or added information may be presented differently or separate from the information in the lost item report. In one embodiment, the merged information may be presented as italics, bolded, in a different font, in a different text size, or presented in any other known different manner. In another embodiment, the merged information may be set apart from the information in the lost item report. For example, the added information may be presented and set apart in brackets, quotation marks, on a different line, or set apart in any other known manner. As illustrated, the merged information 350 is set forth in quotation marks, displayed in all capital letters, and bolded.

Figure 4A:
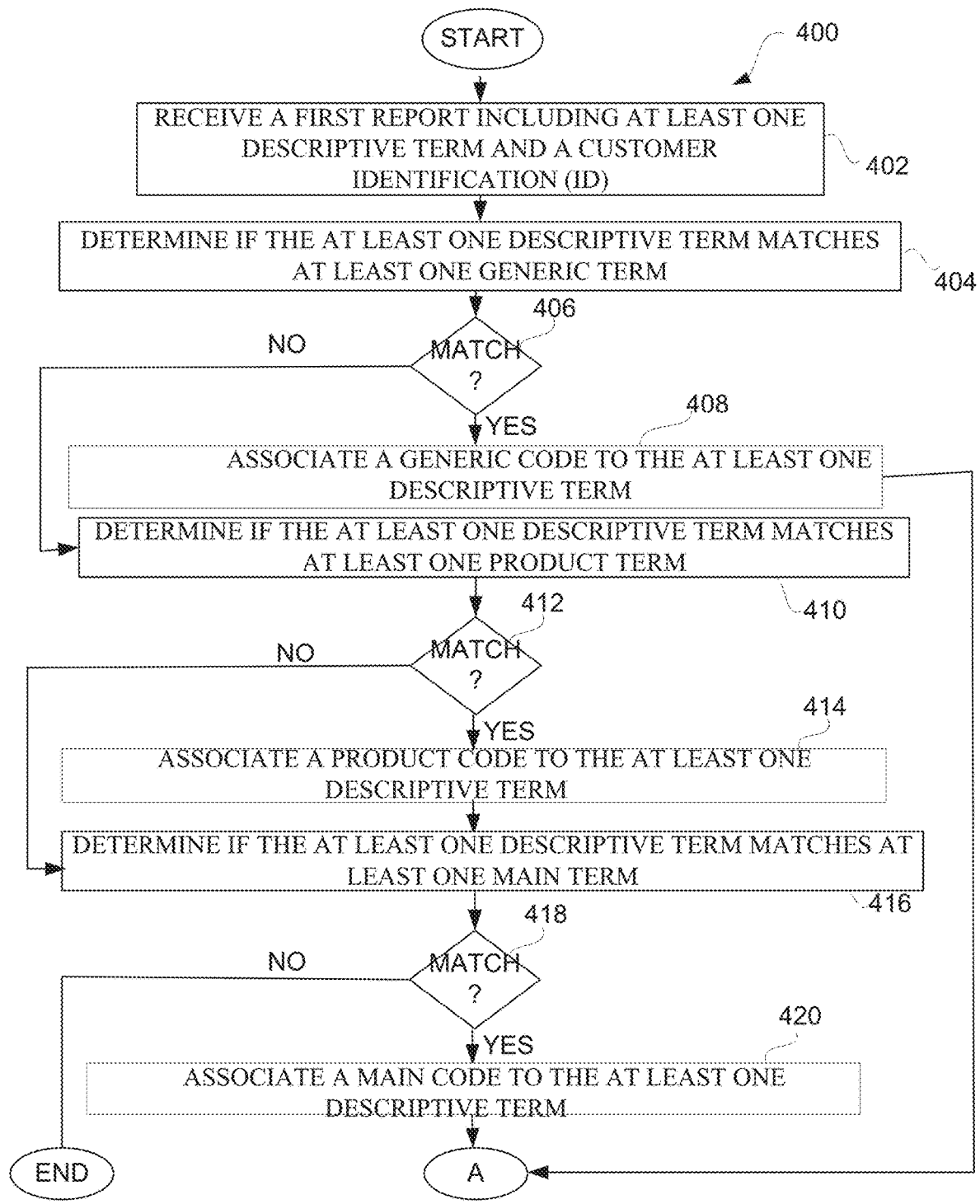
FIGS. 4A and 4B illustrate an exemplary method for locating and merging records.
Figure 4B:
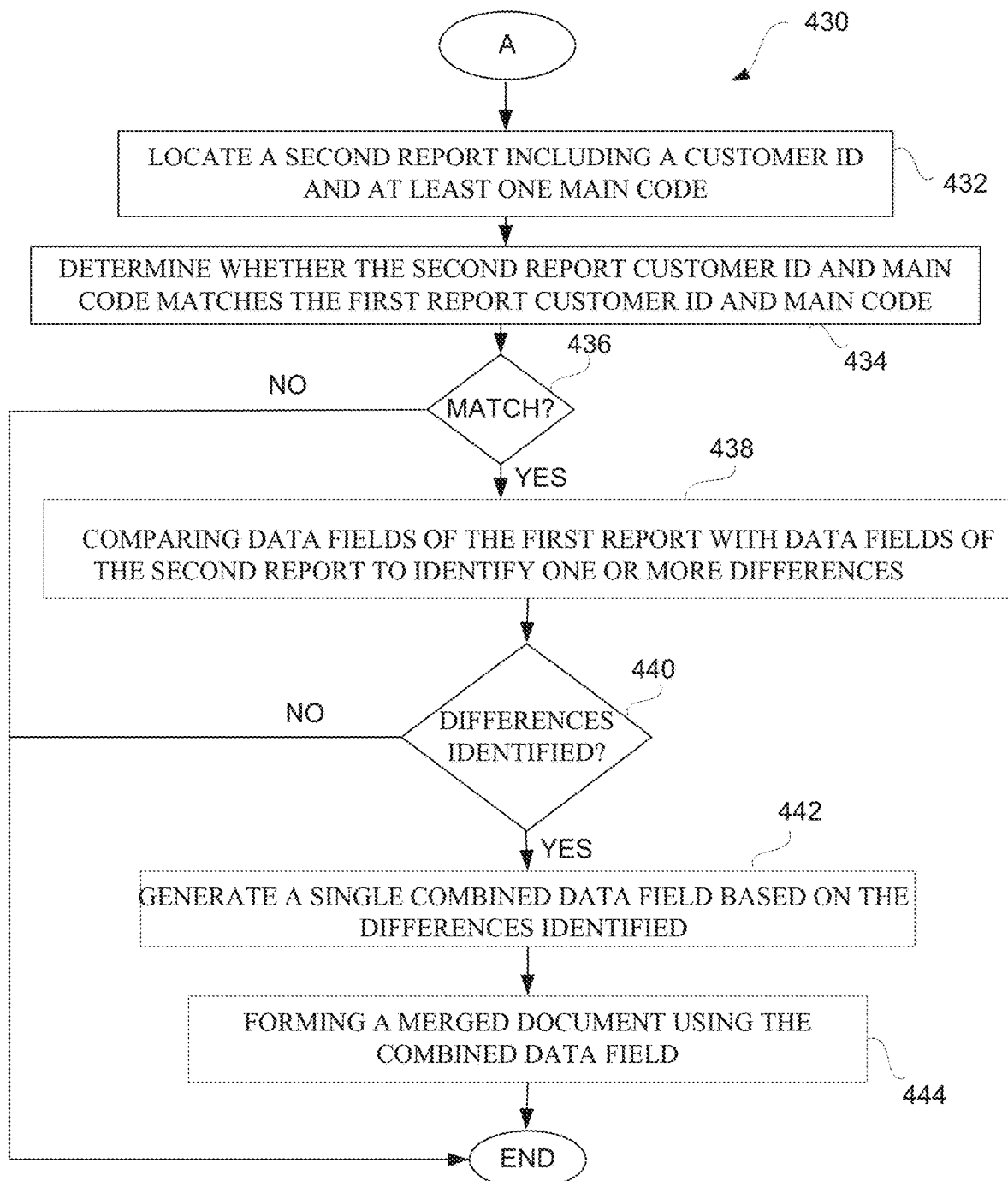

FIGS. 4A and 4B illustrate an exemplary method for locating and merging records. The method 400 provides that a first report may be received at 402. The report may have a plurality of data fields, including at least one descriptive term and a customer identification. Other data fields may also include associated codes and any other desired data fields. Customer identification may include information such as name, unique or user identification, phone number, address, password, electronic mail, or any other desired customer information. Item information may also include descriptive information of the item, location of where the item was lost or found, date the item was lost or found (e.g. a business name, room number, seat number, level, and/or additional location data of where the item was found), entry date of the report, and any other desired lost item information. Associated codes may be any codes associated with the report based upon keywords or terms obtained from the item information.

A determination if the at least one descriptive term matches at least one generic term is made at 404. If a match is found at 406, a generic code is associated with the at least one descriptive term at 408. The generic terms 128 may define what a product is. For example, under product term "SHOES", the generic terms may include sneakers, flip flop, high heel, crocks, boots and the like. In another example, product term "health beauty" may include the generic terms concealer, foundation, mineral, powder, and the like. As such, there may be substantially more generic terms than product terms, and substantially more product terms than main terms.

Each generic term 128 may be assigned a code or unique identifier. For example, "sneakers" may be assigned code 10-4B-C, "dress" may be assigned code 10-4B-GG, and the like. Although illustrated in numerical format, the code may be any unique code or identifier consisting of text, symbols, or numbers.

If no match is found at 406, a determination if the at least one descriptive term matches at least one product term at 410. If a match is found at 412, a product code is associated with the at least one descriptive term at 414. The product terms may be a higher-level term than the generic terms yet define what the products are. For example, the product terms may include pants, shirts, dress, shoes, and the like to describe the product "CLOTHING". In another example, product terms perfume, make-up, razor, soap, lipstick, and the like may describe "HEALTH BEAUTY". Each product term may be assigned a code or unique identifier. For example, "pants" may be assigned code 10-1, "shirt" may be assigned code 10-2, and the like. Although illustrated in numerical format, the code may be any unique code or identifier consisting of text, symbols, or numbers.

In one embodiment, each of the product terms and generic terms may also include alternative or misspelled keywords. For example, generic terms may include the following alternative or misspelled terms for "CROCS": "croks"; "crooks"; "krocks"; "kroks"; and any other misspelled terms. In another example, product term may include the following misspelled terms for "SNEAKERS": "sneeker";

"sneker"; "sneckr"; "snecker"; "sneaker"; and any other alternative or misspelled terms.

If no match is found at 412, a determination if the at least one descriptive term matches at least one main term is made at 416. If no match is found at 418, the method 400 may end. If a match is found at 418, a main code is associated with the at least one descriptive term at 420. The main terms may be main or high-level keyword terms to describe various products. The main terms may be a description used to describe a plurality of products. For example, main terms may include "clothing", "electronics", "sporting goods", and the like. Each main term may be assigned a code or unique identifier. For example, "clothing" may be assigned code 10. Although illustrated in numerical format, the code may be any unique code or identifier consisting of text, symbols, or numbers.

Since the main terms are high-level terms, there are less main terms than product terms and generic terms. Additionally, there are more generic terms than product terms since the generic terms are descriptive terms describing the product terms.

Referring now to FIG. 4B, the method 430 starts with locating a second report at 432. The second report, may have a plurality of data fields, including at least one descriptive term and a customer identification data field. Other data fields may also include associated codes and any other desired data fields. Customer identification may include information such as name, unique or user identification, phone number, address, password, electronic mail, or any other desired customer information. Item information may also include descriptive information of the item, location of where the item was lost or found, date the item was lost or found (e.g. a business name, room number, seat number, level, and/or additional location data of where the item was found), entry date of the report, and any other desired lost item information. Associated codes may be any codes associated with the report based upon keywords or terms obtained from the item information.

A determination whether the second report customer identification and main code matches the first report customer identification and main code at 434. Although described with matching the customer identification and main code data fields, this is not intended to be limiting as any data fields may be matched. For example, the customer identification and all the associated codes may be matched. If a match is found at 436, data fields of the first report with data field of the second report is compared to identify one or more differences at 438. If any differences are identified at 440, a single combined data field based on the differences identified may be generated at 442 to form a merged document using the combined data field at 444.

Although illustrated as merging two documents, this is not meant to be limiting as more than one document may be merged. For example, there may be two or more found item reports that may be merged with a single lost item report. In another embodiment, two or more lost item reports may be merged with a single found item report. Furthermore, although illustrated as merging a lost item report with a found item report, this is not intended to be limiting as two ore more lost item reports may be merged. In another embodiment, two or more found item reports may be merged. In still another embodiment, the found item report may be merged with the lost item report.

The resulting merged report or document may include information both from the first report and the second report. The merged or added information may be presented differently or separate from the information in the merged document. In one embodiment, the merged information may be presented as italics, bolded, in a different font, in a different text size, or presented in any other known different manner. In another embodiment, the merged information may be set apart from the information in the lost item report. For example, the added information may be presented and set apart in brackets, quotation marks, on another line, or set apart in any other known manner.

Figure 5:
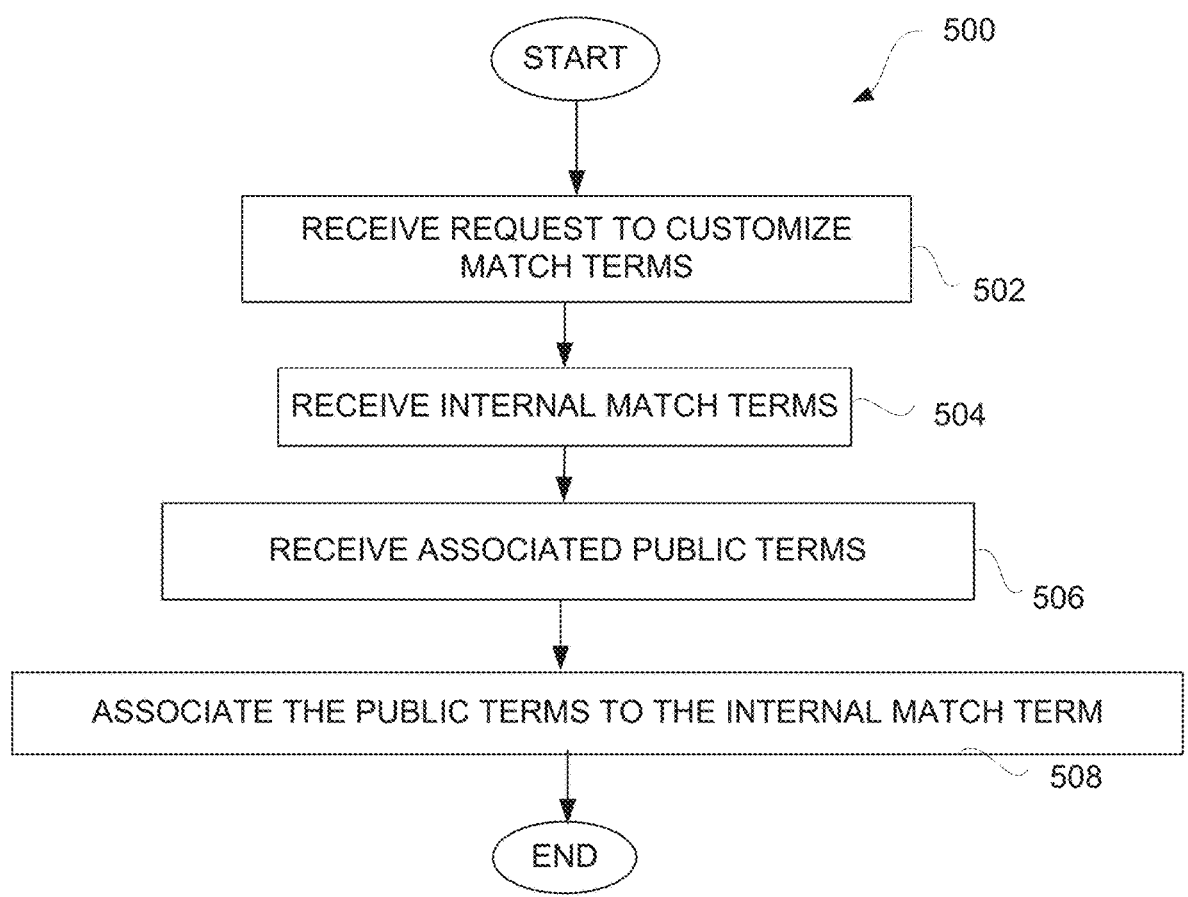
FIG. 5 illustrates an exemplary method for creating customized match terms.

FIG. 5 illustrates an exemplary method for creating customized match terms. The method 500 starts by receiving a request to customize match terms at 502. Recovery server (such as recovery server 108 illustrated in FIG. 1) may allow the establishment to further customize its own match terms stored in a database (such as establishment term database 118 illustrated in FIG. 1). Internal match terms may be received at 504. For example, if the establishment is a hotel, the hotel's main terms may be internal terms associated with a location within the hotel. For example, the internal term "ZONE-1-LOBBY" may be associated with the reception area of the lobby, internal term "ZONE-2-LOBBY" may be associated with the waiting are of the lobby, and internal term "POOL-NW" may be associated with the Jacuzzi area of the pool.

Associated public terms may be received at 506. Each internal term may have a plurality of generic public terms associated with each of the internal terms at 508. For example, "ZONE-1-LOBBY" may be associated with generic public terms "reception", "concierge", "front desk", "check-in", "receptionist", and the like. In another example, "POOL-NW" may be associated with generic public terms "Jacuzzi", "hot tub", "spa", "hot-tub", and the like.

In one embodiment, a recovery server may allow the establishment to add, edit, or delete any existing or predefined match terms (e.g. the main terms, product terms, or generic terms) to further customize the match terms to the establishment's desires. For example, the establishment may want to change or customize the pre-defined match term "CLOTHING" to "WOMEN CLOTHING" and "MEN CLOTHING". In other words, the establishment may customize any existing hierarchy of match terms stored in the match server databases.

Figure 6B:
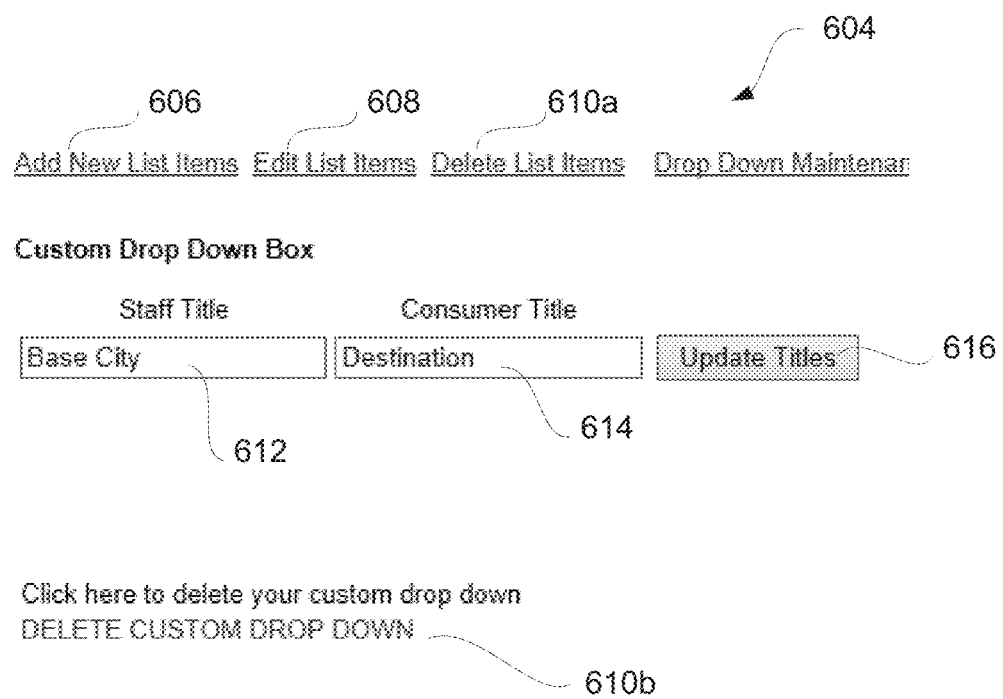

FIGS. 6a and 6b are exemplary screen shots illustrating customization of match terms. Referring to FIG. 6a, the screen shot 600 illustrates customization of match terms. The graphical user interface 600 allows an establishment (such as establishment server 104 illustrated in FIG. 1) to request customization of match terms at 602. Recovery server (such as recovery server 108 illustrated in FIG. 1) may allow the establishment to further customize its own match terms stored in a database (such as establishment term database 118 illustrated in FIG. 1).

Referring to FIG. 6b, the screen shot 604 illustrates customization of match terms. The graphical user interface 604 allows the establishment to add new word terms 606, edit existing or saved terms 608, or delete existing or saved terms 610a,b. To customize match terms, the establishment may enter an internal term at 612 as well as a public term at 614. For example, if the establishment is a hotel, the hotel's main terms may be internal terms associated with a location within the hotel. For example, the internal term "ZONE-1-LOBBY" may be associated with the reception area of the lobby, internal term "ZONE-2-LOBBY" may be associated with the waiting are of the lobby, and internal term "POOL-NW" may be associated with the Jacuzzi area of the pool.

The customized match terms may be received by the recovery server when "UPDATE TITLES" 616 or any other similar button is selected. Each internal term may have a plurality of generic public terms associated with each of the internal terms at 508. For example, "ZONE-1-LOBBY" may be associated with generic public terms "reception", "concierge", "front desk", "check-in", "receptionist", and the like. In another example, "POOL-NW" may be associated with generic public terms "Jacuzzi", "hot tub", "spa", "hot-tub", and the like.

In one embodiment, a recovery server may allow the establishment to add 606, edit 608, or delete 610*a,b* any existing or pre-defined match terms (e.g. the main terms, product terms, or generic terms) to further customize the match terms to the establishment's desires. For example, the establishment may want to change or customize the pre-defined match term "CLOTHING" to "WOMEN CLOTHING" and "MEN CLOTHING". In other words, the establishment may customize any existing hierarchy of match terms stored in the match server databases.

Figure 7:
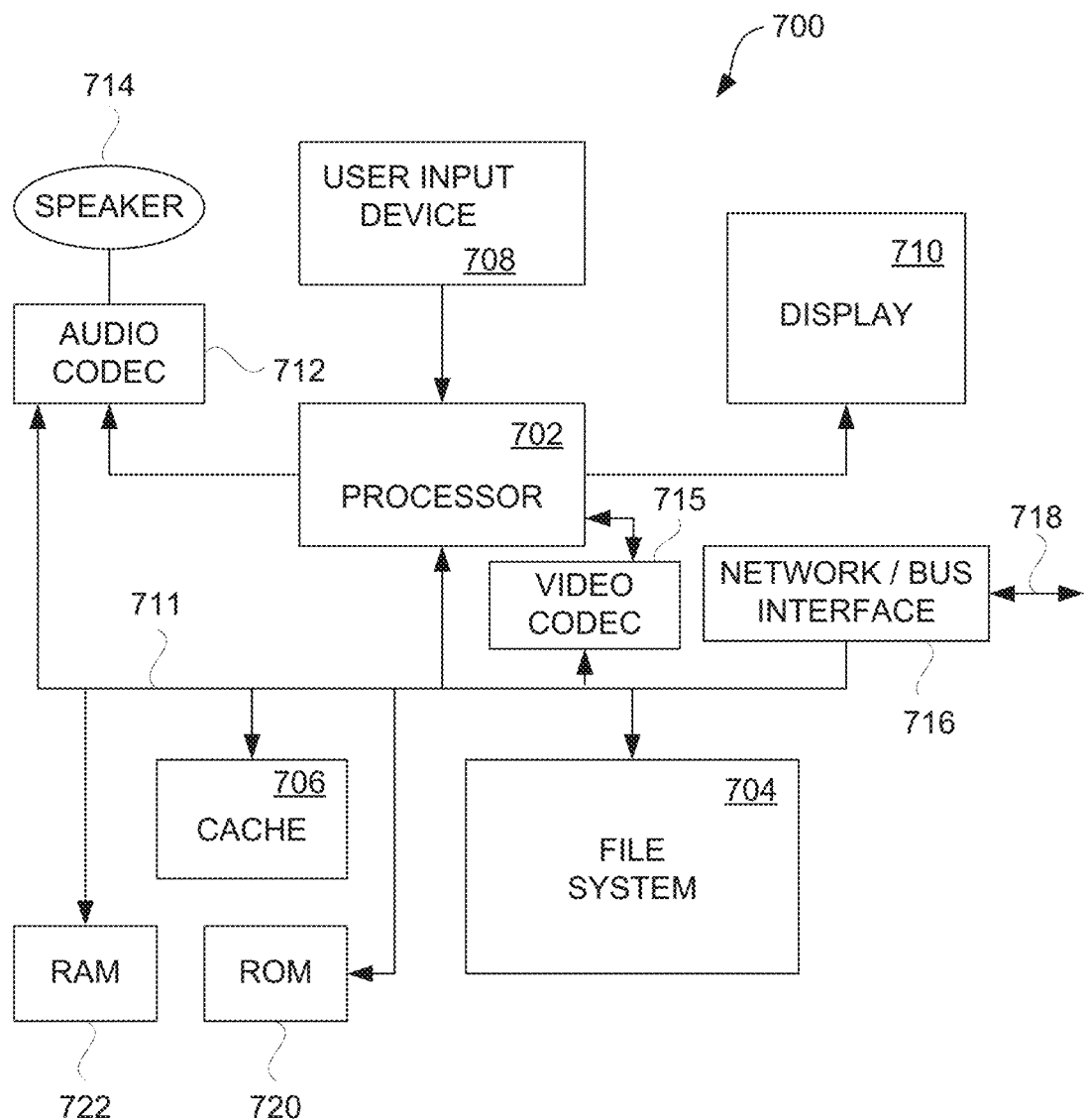
FIG. 7 illustrates a block diagram of a computing device according to one embodiment.

FIG. 7 illustrates a block diagram of a computing device 700 according to one embodiment. The computing device 700 can represent circuitry of a representative computing device (e.g. client device, recovery sever, shipping server, third party payment server, establishment server) described and illustrated in FIG. 1. The computing device can be designed to primarily stationary or can be portable.

The computing device 700 includes a processor 702 that pertains to a microprocessor or controller for controlling the overall operation of the computing device 700. The computing device 700 stores media data pertaining to media items in a file system 704 and a cache 706. The file system 704 is, typically, semiconductor memory (e.g., Flash memory) and/or one or more storage disks. The file system 704 typically provides high capacity storage capability for the computing device 700. However, since the access time to the file system 704 can be relatively slow, the computing device 700 can also include the cache 706. The cache 706 is, for example, Random-Access Memory (RAM). The relative access time to the cache 706 is typically shorter than for the file system 704. However, the cache 706 does not have the large storage capacity of the file system 704. The computing device 700 also includes a RAM 720 and a Read-Only Memory (ROM) 722. The ROM 722 can store programs, utilities or processes to be executed in a non-volatile manner. The RAM 720 provides volatile data storage, such as for the cache 706.

The computing device 700 may also include a user input device 708 that allows a user of the computing device 700 to interact with the computing device 700. For example, the user input device 708 can take a variety of forms, such as a button, keypad, dial, touch-sensitive surface, etc. Still further, the computing device 700 includes a display 710 (screen display) that can be controlled by the processor 702 to display information to the user. A data bus 711 can facilitate data transfer between at least the file system 704, the cache 706, the processor 702, an audio coder/decoder (CODEC) 712 and/or a video CODEC 715.

In one embodiment, for example, if the computing device 700 (e.g. client device 102*a-n*, establishment server 104 illustrated in FIG. 1) is a portable electronic device, the computing device 700 may store a plurality of data fields (e.g., customer information, product description, etc.) in the file system 704. When a user desires to report a lost item report the computing device may allow the user to input information in the data fields. The data fields may be displayed on the display 710. Then, using the user input device 708, a user can select one of the available data fields. The processor 702, upon receiving an input, stores the input into the data fields and, if necessary, out it to one or more appropriate output devices. If the particular media item is encrypted, the particular media item is first decrypted as noted above, which could involve one or more layers of encryption. As an example, for audio output, the processor 702 can supply the media data (e.g., audio file) for the particular media item to the audio CODEC 712. The audio CODEC 712 can then produce analog output signals for a speaker 714. The speaker 714 can be a speaker internal to the computing device 700 or external to the computing device 700. For example, headphones or earphones that connect to the computing device 700 would be considered an external speaker. As another example, for video output, the processor 702 can supply the media data (e.g., video file) for the particular media item to the video CODEC 715. The video CODEC 715 can then produce output signals for the display 710 and/or the speaker 714.

The computing device 700 also includes a network/bus interface 716 that couples to a data link 718. The data link 718 allows the computing device 700 to couple to another device (e.g., a host computer, a power source, or an accessory device). The data link 718 can be provided over a wired connection or a wireless connection. In the case of a wireless connection, the network/bus interface 716 can include a wireless transceiver.

Figure 8:
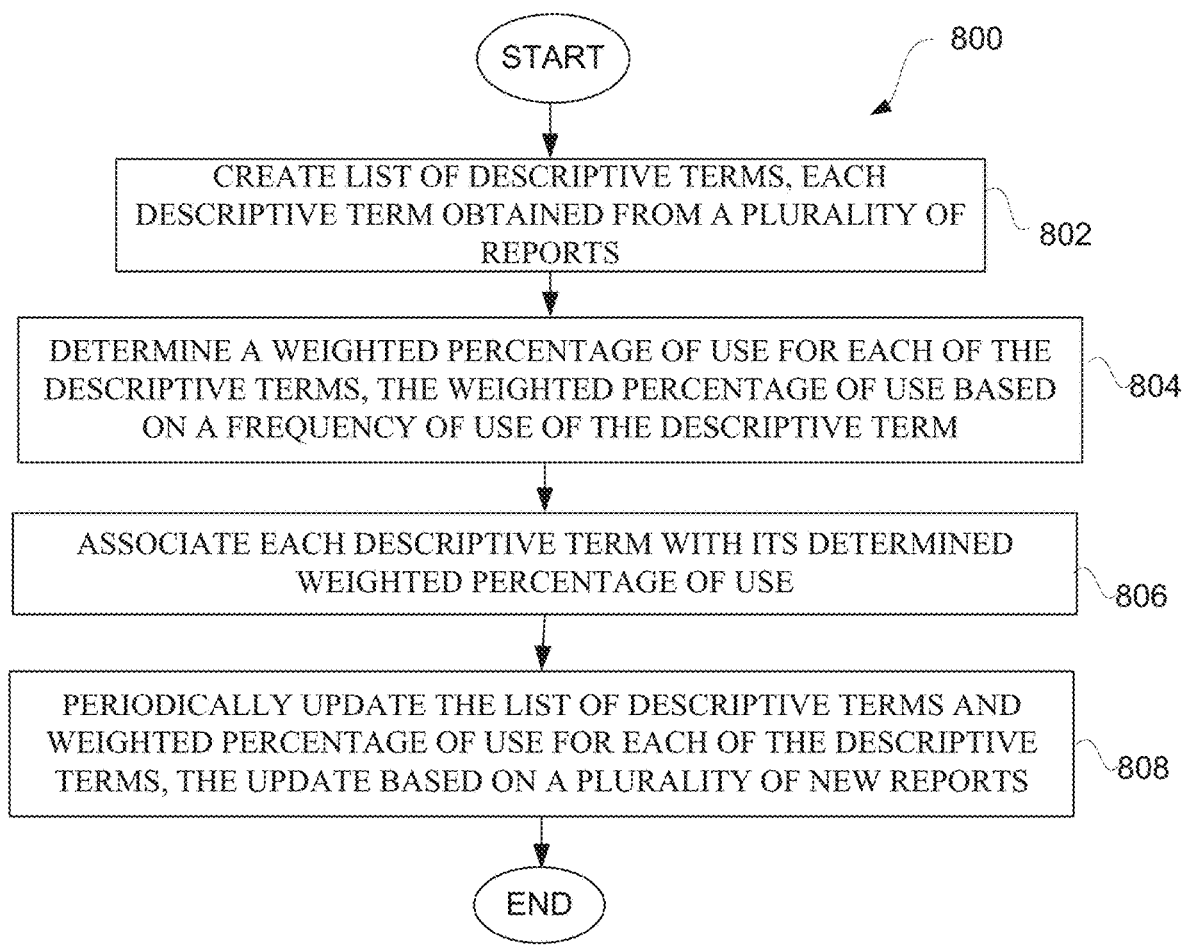
FIG. 8 illustrates a flow diagram for determining a weighted percentage of use for at least one keyword in accordance with one embodiment.

FIG. 8 illustrates a flow diagram for determining a weighted percentage of use for at least one keyword in accordance with one embodiment. The method 800 begins with creating a list of descriptive terms or keywords, each descriptive term obtained from a plurality of reports at 802. The reports may be prior lost and/or found records or reports. The prior lost and/or found records or reports may have been submitted from users that lost or found items. Each descriptive term or keyword may be parsed and provided in a list. A weighted percentage of use for each of the descriptive terms may be determined at 804. The weighted percentage of use may be based on a frequency of use of each of the descriptive terms. In other words, keywords having a higher frequency of use may be assigned a higher weighted percentage of use.

Each of the descriptive terms or keywords may be associated with its determined weighted percentage of use at 806. Once assigned, the list of descriptive terms and weighted percentage of use for each of the descriptive terms may be periodically updated based on a plurality of new reports at 808. As each new lost and/or found records or reports are submitted, the descriptive terms or keywords are parsed from the record or report. The descriptive terms or keywords are either added to the descriptive term list if a new descriptive term or the weighted or the weighted percentage of use may be updated if the descriptive term is already on the list.

In one embodiment, the weighted percentage of use may decrease depending on a found date of an item. Generally, 95% of all matches occur within four days of the lost and found events. For example, if an item was lost on July $4^{th}$, there is a 95% chance that if the item is ever found, it will be found by July 8th. The weighted percentage of use may be higher if the item was found on the same day, and decreases as days pass. In other words, the weighted percentage of use decreases on July $5^{th}$ and even more on July $6^{th}$. The percentage of decrease may be, in one embodiment, predetermined by the user.

Figure 9:
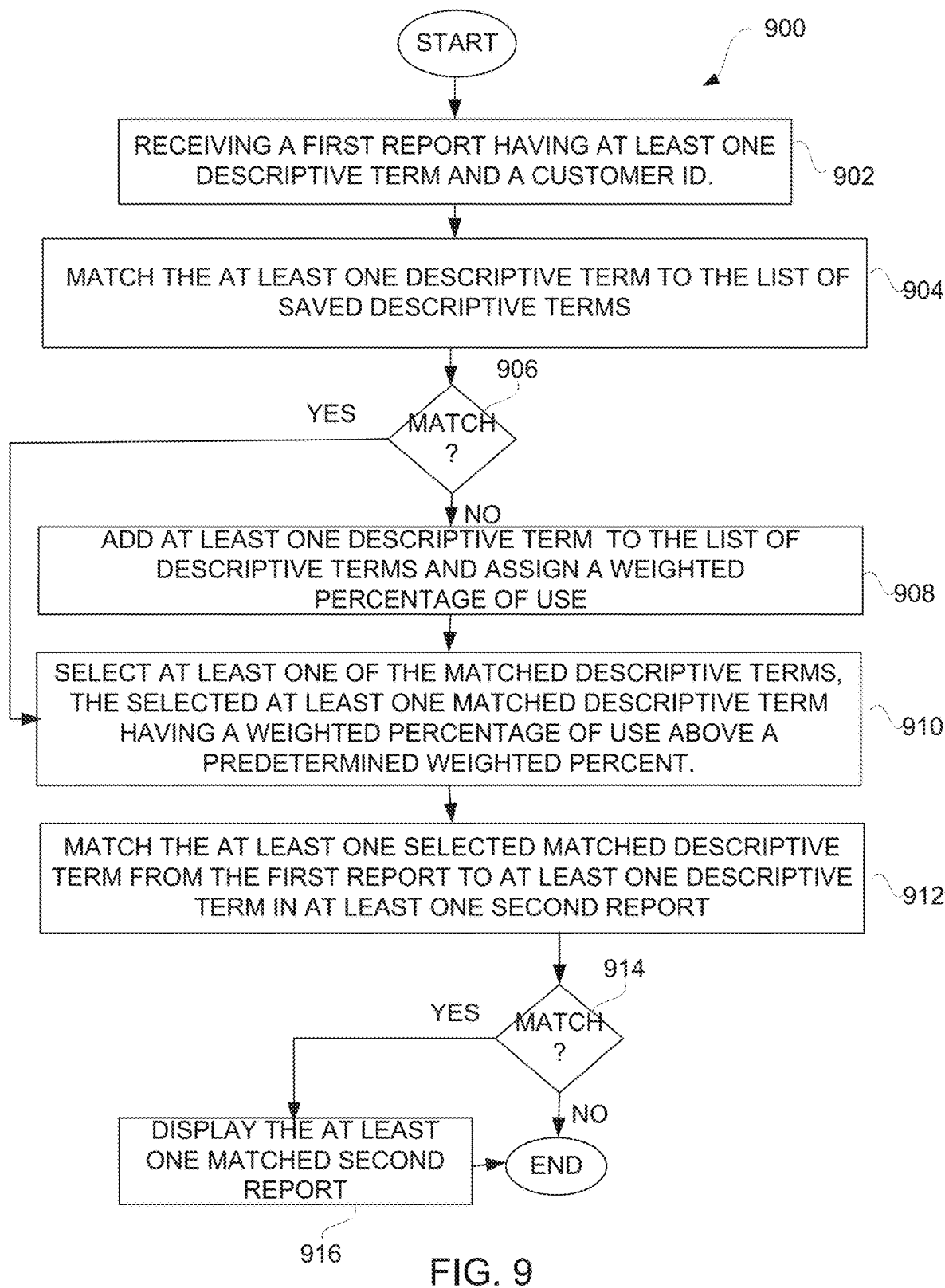
FIG. 9 illustrates a flow diagram for locating matching records that may be merged.

FIG. 9 illustrates a flow diagram for locating matching records that may be merged. The method 900 begins with receiving a first report at 902. The report may have a plurality of data fields, including at least one descriptive term and a customer ID. Other data fields may also include associated codes and any other desired data fields. Customer identification may include information such as name, unique or user identification, phone number, address, password, electronic mail, or any other desired customer information. Item information may also include descriptive information of the item, location of where the item was lost or found, date the item was lost or found (e.g. a business name, room number, seat number, level, and/or additional location data of where the item was found), entry date of the report, and any other desired lost item information. Additional information such as colors, brands, condition of the item, and the product code of the item may be included. The product code, for example, may be the serial number of the item.

Each term used to describe the lost or found item may be included in the list of descriptive terms or keywords. At least one descriptive term may be matched to the list of saved descriptive terms at 904. If there is no match at 906, the at least one descriptive term may be added to the list of descriptive terms and assigned a weighted percentage of use at 908. If there is a match at 906, at least one of the matched descriptive terms is selected at 910. The at least one selected matched descriptive term may have a weighted percentage of use above a predetermined weighted percent. For example, the user may predetermine that keywords having a weighted percentage of use above 50% may be selected. In another example, the user may predetermine or preset the weighted percentage of use to keywords having a weighted percentage of use above 75% may be selected.

The at least one selected matched descriptive term from the first report may be matched to at least one descriptive term in at least one second report at 912. Keywords having a high weighted percentage of use in the first report may be matched to keywords in a second report to determine if the items are a match. In one embodiment, a subset of keywords used in the first report may be matched to a subset of keywords used in the second report. If there is a match at 914, the at least one matched second report may be displayed at 916.

Figure 10A:
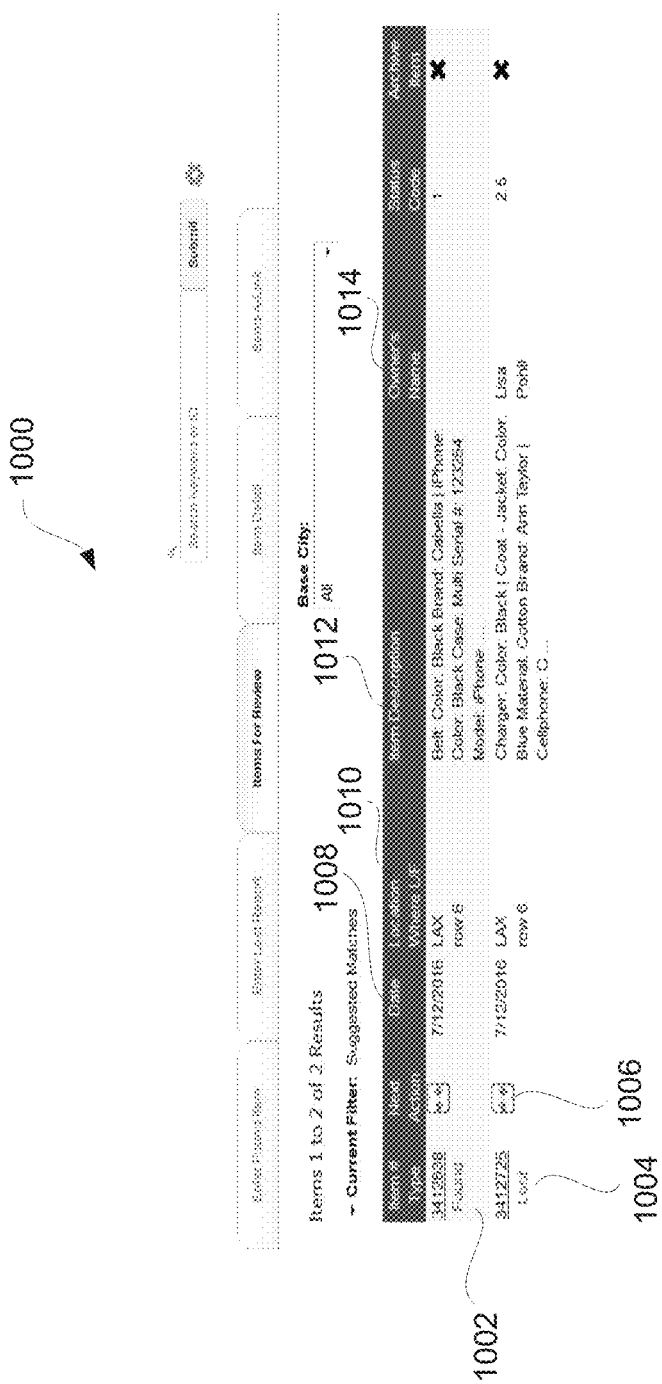

FIGS. 10A-10C illustrate example screenshots illustrating the matching and merging of reports. FIG. 10A illustrates a screen shot 1000 of a list of reports. Each report may contain a plurality of data fields such whether the report is a found report 1002 or a lost report 1004. Other data may be the date of the event 1008, location where the item was lost or found 1010, description of the item 1012, and the owner's or founder's information 1014. Each report may also contain a match identifier 1006 to determine potential matches. When the match identifier 1006 is selected, at least one match report may be displayed as illustrated in FIG. 10B.

Referring now to FIG. 10B, the screen shot 1020 may display at least one match report 1030. The user may scroll between all the potential matching using the scroll identifier 1026. On a portion of the display, the lost item report 1028 may be displayed proximate to or adjacent the match report 1030. The user may selected to merge indicator 1022 to merge the lost report 1028 with the match report 1030 or reject indicator 1024 to not merge the lost report 1028 with the match report 1030. The reports may be merged as described above.

In another embodiment, after having merged two documents, the user may determine that the two documents were improperly merged. The user may select a demerge indicator (not shown) and the documents will be returned to each of their original states as if they were not merged. In one embodiment, archived copies of both reports may be recovered and restored and the merged document may be deleted.

When determining possible reports to match, descriptive terms or keywords maybe used. For example, the item term "coat" and/or "jacket" may have a high weighted percentage of use and therefore used to determine the match report 1030. In another example, the brand term "Ann Taylor" may have a high weighted percentage of use and therefore used to determine the match report 1030. In still another example, both the item term and brand term may have been used to determine the match report 1030. Although the item and brand data field are discussed, this is not intended to be limiting as any other data may be used such as product codes, color, detailed personal identification (i.e. a found passport), location of lost item or found item, flight number, contract number, ticket number, and the like.

Furthermore, in one embodiment, the found date 1038 is the same as the lost date 1036. Therefore, the weighted percentage of use may be high for the item terms and brand terms. However, if the item was found three or four days later, the weighted percentage of use may have been lower for the item term and/or brand term.

The found report 1030 may also have at least one match indicator 1031. The match indicator 1031 may display the percentage of match based on the keywords. For example, a completely colored or shaded match indicator with a check indicates a 100% match. In another embodiment as illustrated in FIG. 10C, if there is no match, the match indicator 1031 may not be colored or shaded in. In still another embodiment, if only 50% of the keywords match, 50% of the match indicator 1031 may be colored or shaded. Although illustrated as a circular shape, the match indicator 1031 may be any shape, size, figure, or indicator to indicate a percent.

Referring now to FIG. 10C, in one embodiment, the report 1040 may list the number of items found 1044. As illustrated, three items were found. The user may hover over an information indicator 1046 and a pop-up box 1042 may appear. The pop-up box 1042 may provide a report summary of each of the items that were found. As illustrated, the items found were a Belt, iPhone, and blankets. Brief information about each of the items may also be displayed.

Figure 11A:
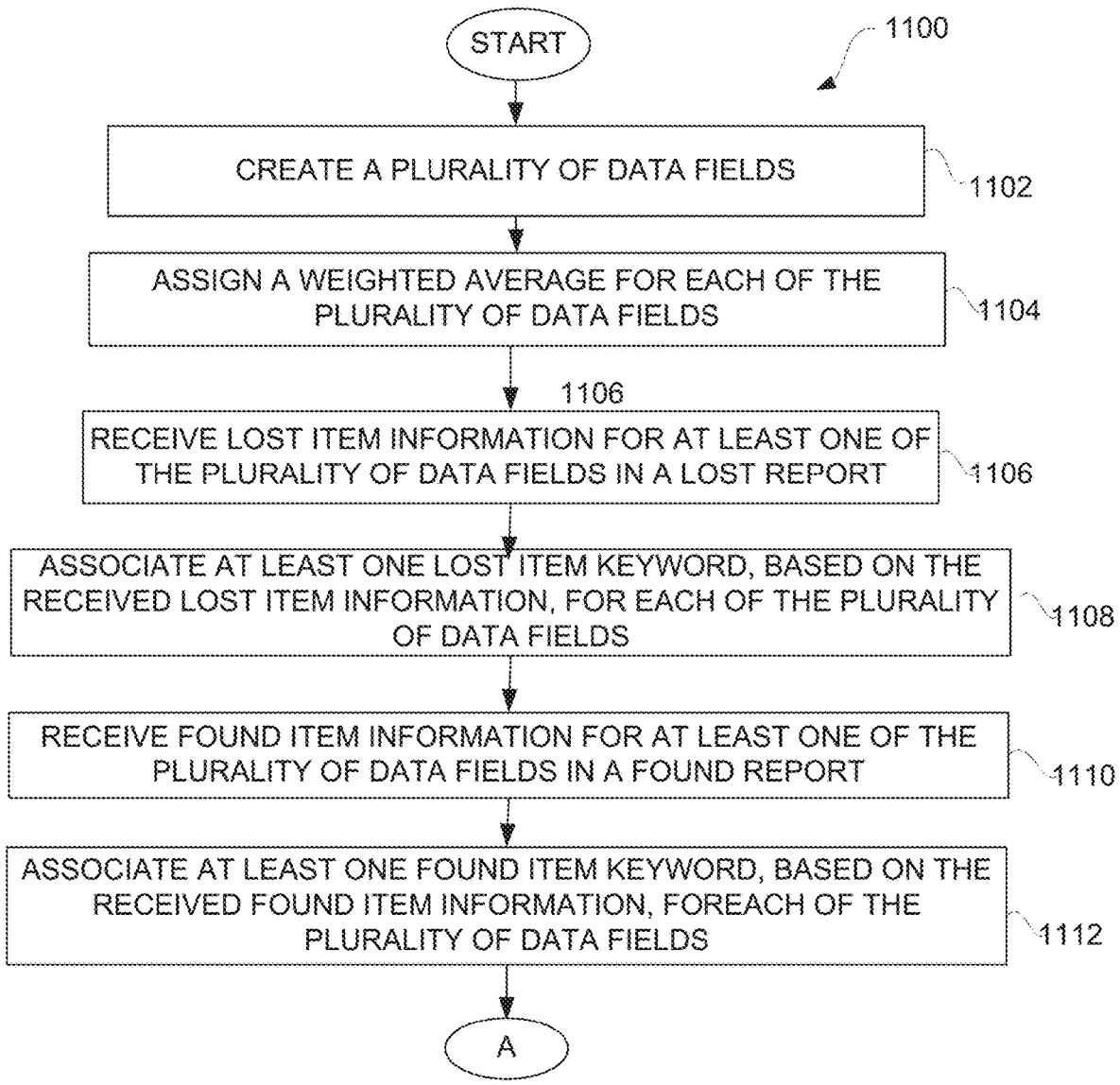
FIGS. 11A-11B illustrate another flow diagram for locating matching records that may be merged.
Figure 11B:
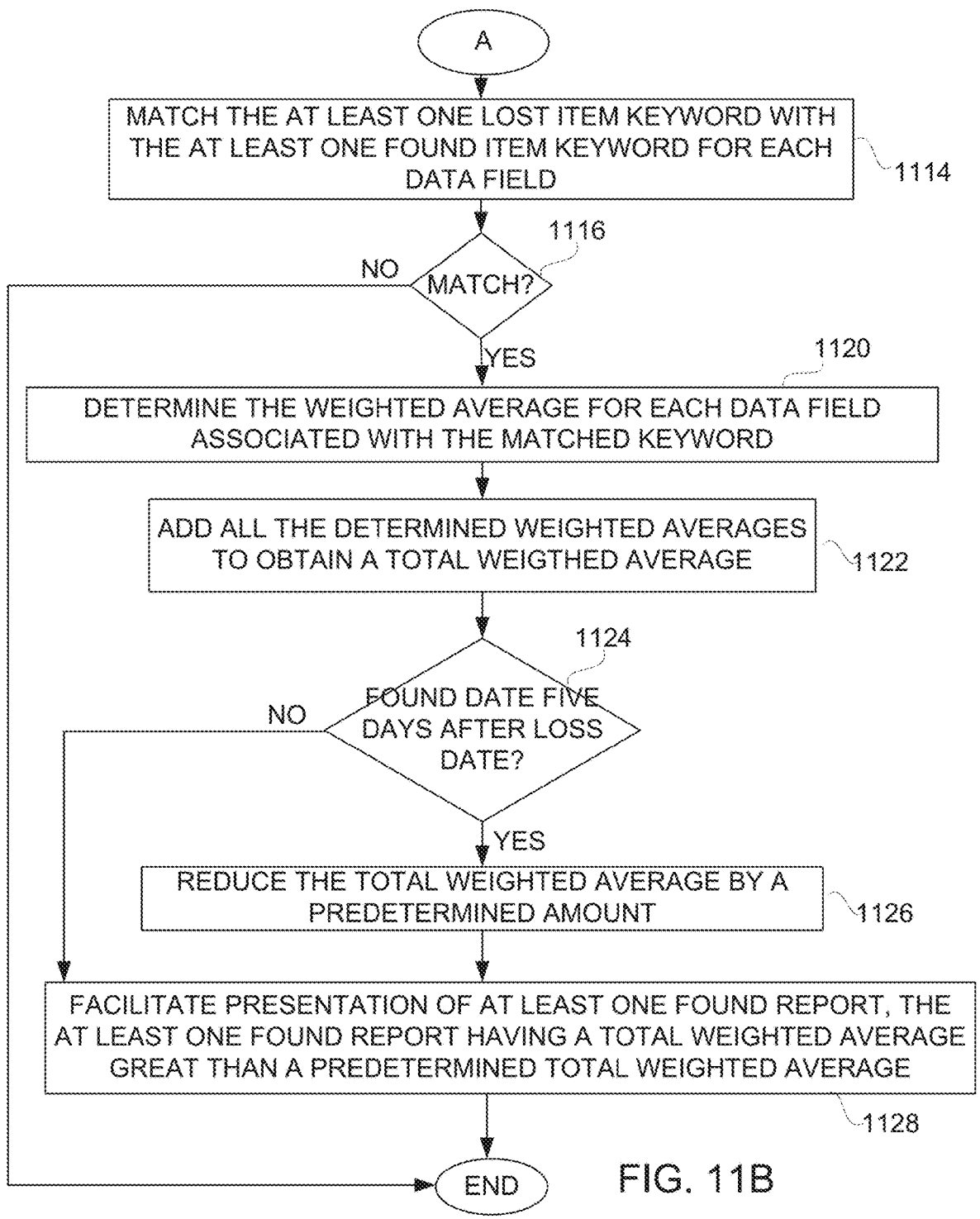

FIGS. 11A and 11B illustrate another flow diagram for locating matching records that may be merged. Referring to FIG. 11A, the method 1100 begins with creating a plurality of data fields at 1102 for lost reports and found reports. The data fields may be any field necessary to assist a customer in reporting a lost item and/or reporting a found item. For example, the data fields may be color of the item, what the item is, brand of the item, serial number, and any other desired data field.

A weighted average may be assigned for each of the plurality of data fields at 1104. Different data fields may have a predetermined weighted percentage. Each data field may be assigned a higher or lower weighted percentage. For example, the "model" field be weighted higher (i.e. 50 points or percent) than the "color" field (i.e. 10 points or percent). In another example, the "airport location" field (of the lost time or found item) may be weighted higher (i.e. 60 points or percent) than the "material" field (i.e. 5 points or percent) as the airport location field of the found item may be determined to be more indicative of a positive match than a material field match.

Lost item information, for a lost item to be reported by a customer or consumer, may be received for at least one of the plurality of data fields at 1106. A customer or consumer that lost an item may report the loss by inputting lost item information into data fields on a graphical user interface presented on a computing device associated with the customer or consumer. The lost item information may be any information desired to describe the lost item such as date of loss, color, make, model, and any other description that may be helpful to identify the lost item.

At least one lost item keyword, based on the received lost item information, may be associated with each of the plurality of data fields at 1108. In one embodiment, the at least one lost item keyword may be, for example, the descriptive terms as described in FIG. 8. In other words, lost item keywords may have a weighted percentage of use above a predetermined weighted percentage of use. In another embodiment, the at least one lost item keyword may only be one keyword selectable by the customer. For example, under a "color" data field, the customer may be able to only select one color, such as blue, black, white, and the like. In another example, for an "airport code" data field, the customer may be able to only select one airport location such as LAS, RDU, LAS, SJC, and the like. Those of ordinary skill in the art will now understand that a combination of both embodiment may also be possible.

Found item information, for a found item to be reported by a customer or consumer, may be received for at least one of the plurality of data fields at 1110. A customer or consumer that found an item may report the find by inputting found item information into data fields on a graphical user interface presented on a computing device associated with the customer or consumer. The found item information may be any information desired to describe the found item such as date found, color, make, model, and any other description that may be helpful to identify the found item.

At least one found item keyword, based on the received found item information, may be associated with each of the plurality of data fields at 1112. In one embodiment, the at least one found item keyword may be, for example, the descriptive terms as described in FIG. 8. In other words, found item keywords may have a weighted percentage of use above a predetermined weighted percentage of use. In another embodiment, the at least one found item keyword may only be one keyword selectable by the customer. For example, under a "color" data field, the customer may be able to only select one color, such as blue, black, white, and the like. In another example, for an "airport code" data field, the customer may be able to only select one airport location such as LAS, RDU, LAS, SJC, and the like. Those of ordinary skill in the art will now understand that a combination of both embodiment may also be possible.

Referring now to FIG. 11B, the at least one lost item keyword may be matched to at least one found item keyword for each of the plurality of data fields at 1114. The keywords for each data field may be matched. For example, if the at least one lost item keyword for the "color" data field was black, it may be matched with a found report having a found item keyword of black in the "color" data field. If there is no match at 1116, the method 1150 may end. If there is a match at 1116, the associated weighted average for each of the data fields associated with the matched keywords are determined at 1120. Each matched keyword is associated with a data field. Each data field may be associated with a weighted average, which was determined at step 1104. The associated weighted averages are added to obtain a total weighted average at 1122.

A determination is made as to whether the found date is five days greater than the loss date at 1124. The date of loss reported on the lost report may be compared to the found date reported on the found report. Although illustrated with a difference of five days, it will now be known that any predetermined number of days may be used such as two days, eight days, and the like. If the found date is five days greater than the loss date, the total weighted average may be reduced by a predetermined amount at 1126. The total weighted average may decrease based on the found date of an item and/or the lost date of an item. Generally, 95% of all matches occur within four days of the lost and found events. For example, if an item was lost on July $4^{th}$, there is a 95% chance that if the item is ever found, it will be found between July $4^{th}$ and July 8th. The total weighted average may decrease as days pass. In other words, the total weighted average may begin to decrease on July $5^{th}$ and even more on July $6^{th}$. As stated above, although illustrated with a difference of five days, it will now be known that any predetermined number of days may be used such as two days, eight days, and the like. The amount of decrease may be, in one embodiment, predetermined by the user. In another embodiment, the total weighted average may automatically decrease by a predetermined percent each day after the fourth day the item was reported as lost, such as by 0.5% each day.

If the date of loss is the same as the found date at 1124, presentation of at least one found report, having a total weighted average above a predetermined total weighted average, may be facilitated at 1128. A found report, having a total weighted average above a predetermined total weighted average, may be a potential match with a lost report. The matched lost and found reports may be presented, for example, as illustrated in FIGS. 10A-C.

Example 1

For exemplary purposes only and not intended to be limiting, an example scenario is provided. Although described with specific data, this is not intended to be limiting as other data and scenarios may be used to accomplish the same or similar result. For example, other fields may be used such as lost location, found location, and material. In another example, the assigned codes may be different, such as include both text and numbers and/or include text, numbers, and symbols.

Figure 12A:
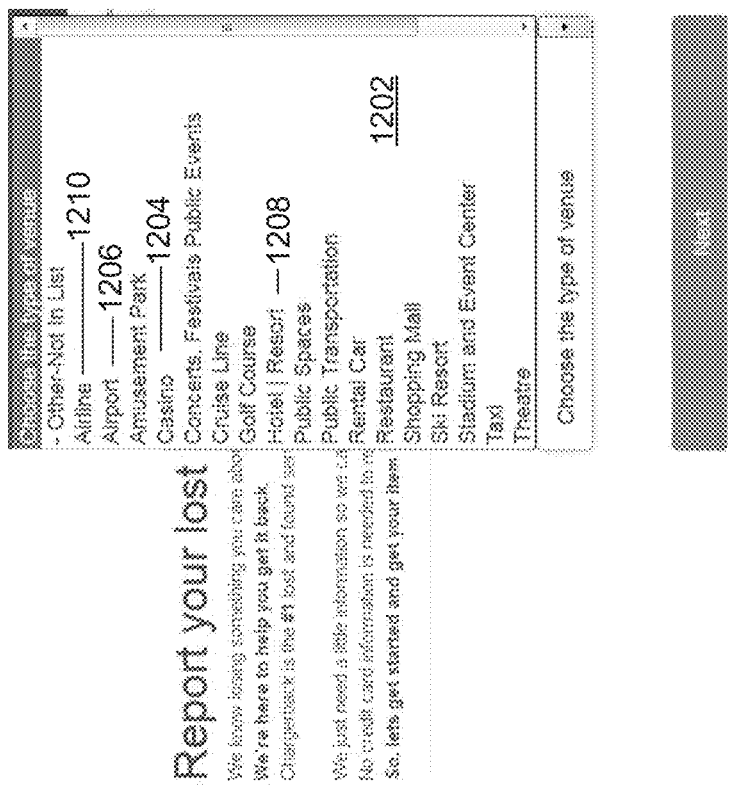

A customer that has lost an item may generate a lost report. The lost report may be generated by inputting responses into a website. For example, a dropdown menu may list a variety of items that may have been lost. The customer may select from one of a plurality of the items. FIGS. 12A-12H are exemplary screenshots in accordance with an embodiment of the present invention. FIG. 12A illustrates a plurality of selectable venues 1202. The venue may be any location an item may be forgotten, left behind, or lost such as ski resort, shopping mall, bus, rental car, theatre, and the like. The customer may select a venue or location where the item was lost. For example, the customer may have lost the item at a casino 1204, airport 1206, or hotel/resort 1208.

Figure 12B:

FIG. 12B illustrates a screenshot illustrating specific types of venues. Upon receipt of a selection of a venue, such as the airline 1210, in FIG. 12A, the user may select a subset of the venue. In FIG. 12B, the name of the airline may be selected from a dropdown menu 1212. The name of the airline may be any known airline such as Allegiant Travel 1214, American Airlines 1216, United Airlines 1218, and the like. In another example, if "amusement park" was selected, the subset dropdown menus may then list a plurality of states and/or countries the amusement park was located. Another subset dropdown menu may also be a list of names of amusement parks in that state or country.

Figure 12C:
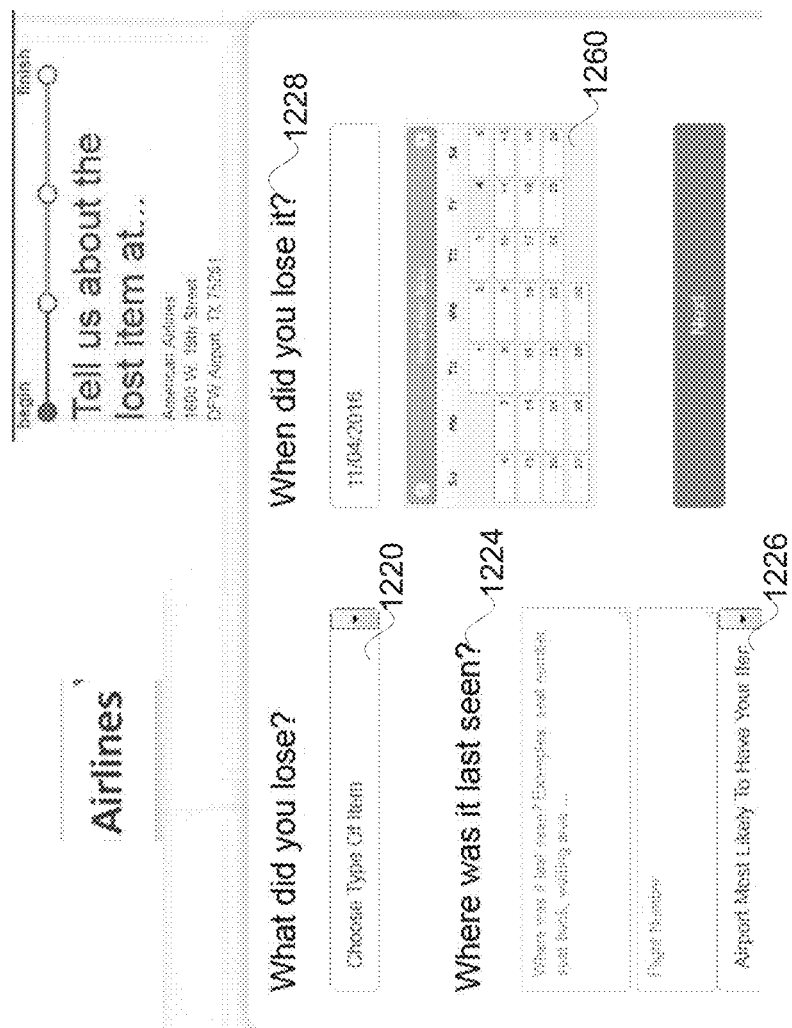
Figure 12D:
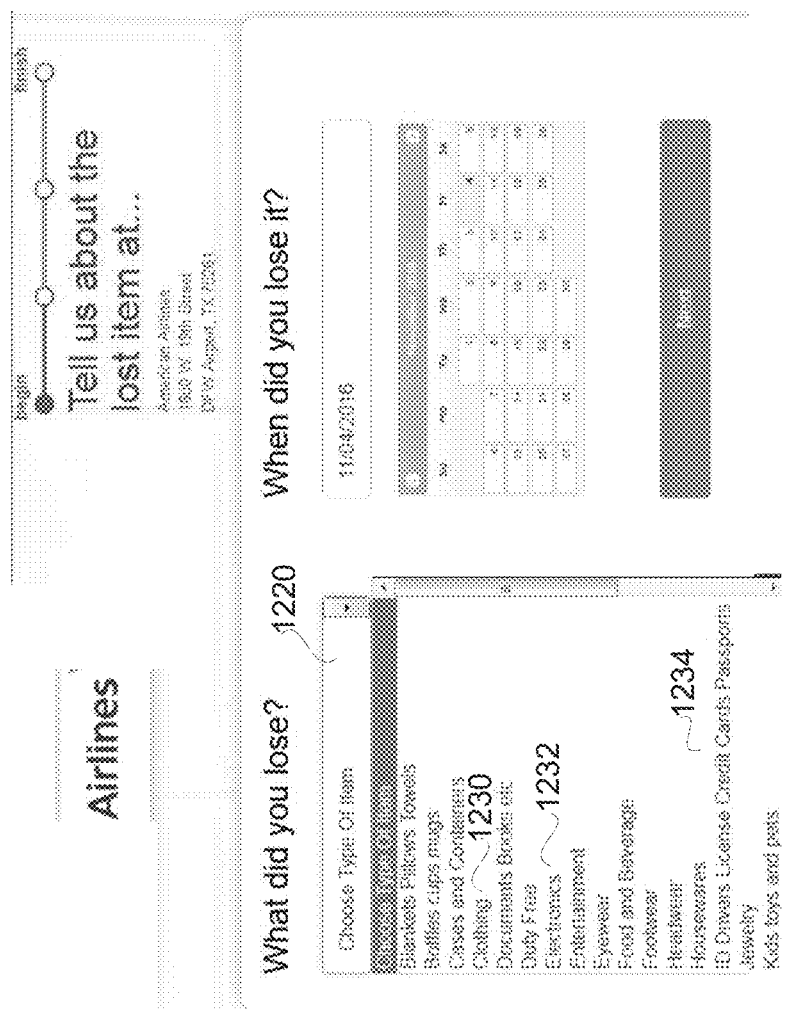

Once selection of an airline is received, the customer may then be prompted to select options that describe the lost item. FIG. 12C illustrates an example screenshot of lost item location selections. The customer may be prompted to select and input location data of where the lost item was lost. For example, the customer may be prompted to select the type of item that was lost 1220, where the lost item was last seen 1224, airport where the lost item was last seen 1226, date of loss 1228, and any other information related to the location of the lost item. The customer may manually input the date or, as illustrated, the customer may select a date from a calendar 1260.

The type of item that was lost 1220, as illustrated in FIG. 2D, may be a list of all types of items such as clothing 1230, electronics 1232, identifications (e.g. license, credit cards, passports, and the like) 1234, and the like. A selection for electronics 1232 may result in a dropdown menu listing different types 1234 of electronics 1232. For examples, the customer may select electronics such as cellular phone 1236, camera 1238, GoPro 1240, and the like.

Figure 12F:
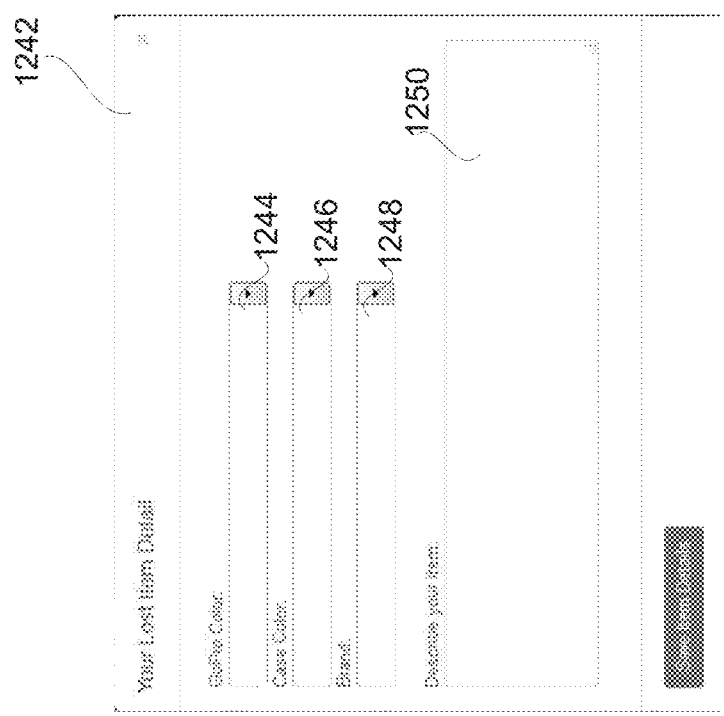
Figure 12G:
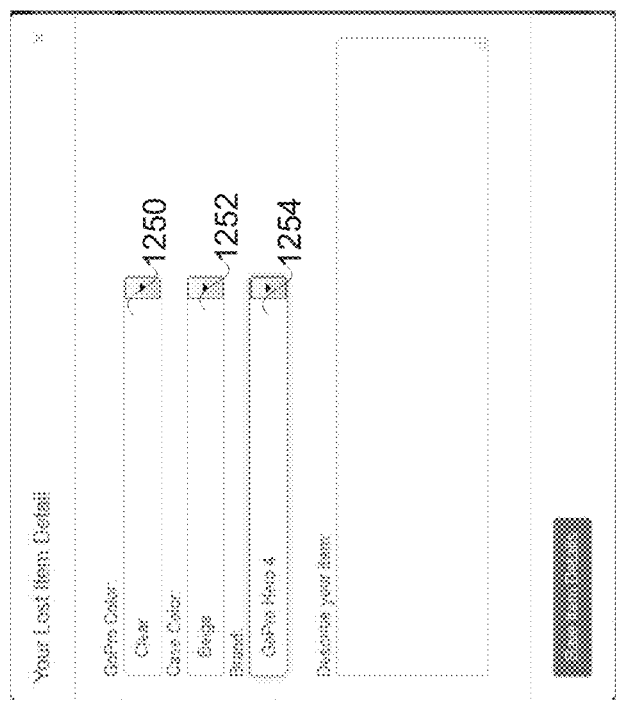

A selection of an electronic type may result in a pop-up box 1242 as illustrated in FIG. 12F. The pop-up box 1242 may request additional information about the lost item. Although illustrated using a pop-up box, this is not intended to be limiting, as those of ordinary skill in the art will know that any other method to obtain the information may be used, such as being directed to another web page or use of a different graphical user interface. As illustrated, the background may be darkened In this example, the lost item may be a GoPro 1240 that was selected in FIG. 12E from the dropdown menu listing different types 1234 of electronics 1232. The pop-up box 1242 may request any desired information about the lost item that will help identify the lost item. For example, the color of the GoPro 1244, case color 1246, brand 1248, and the like. A dropdown menu may list a variety of colors, brands, and the like that the customer may select from. For example, as illustrated in FIG. 12G, the customer may select clear 1250 as the GoPro color, beige 1252 as the case color, and GoPro Hero 4 1254 as the brand.

Referring back to FIG. 12G, the customer may also manually input any other descriptive information about the lost item into box 1250. The information may be used to help identify the lost item. For example, the customer may input other descriptive information about the GoPro such as a scratch or crack on the screen, perhaps a sticker placed on the GoPro, or any other identifying or descriptive information that will help to identify the lost item.

Figure 12H:
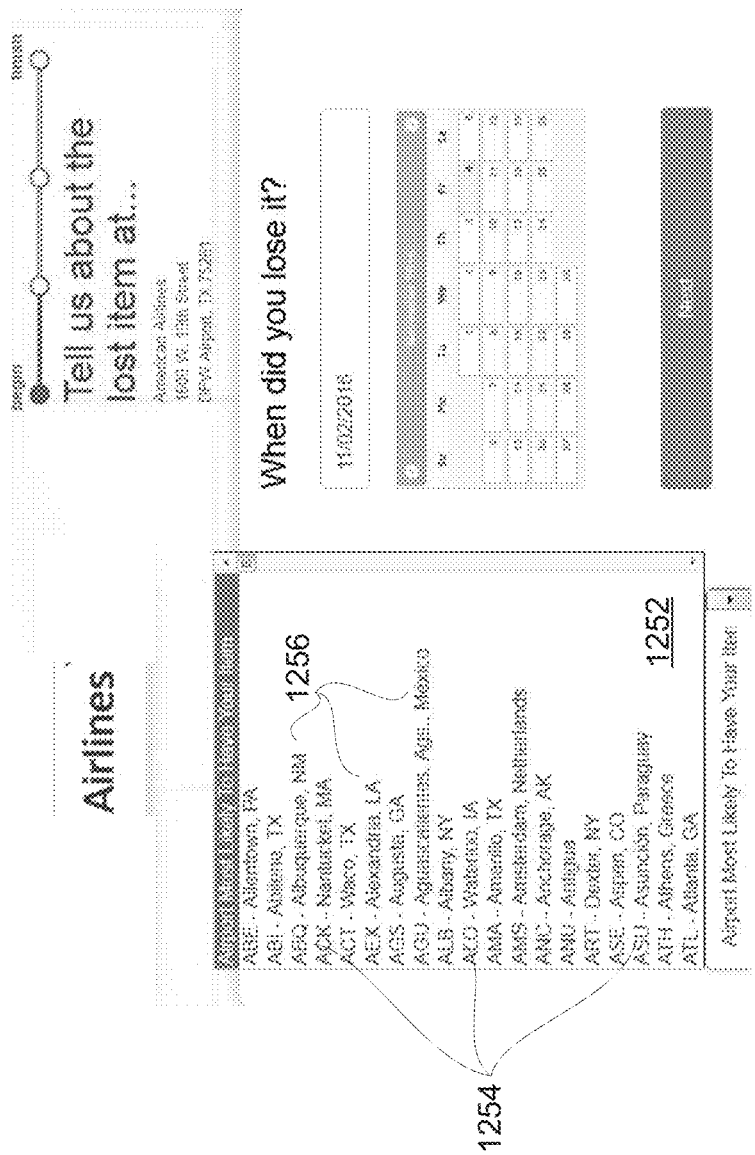

FIG. 12H illustrates an example screenshot illustrating a dropdown menu of the different airports 1252. The airport code 1254 as well as the location 1256 of the airport may be listed.

Based on the input provided, the input is matched with a unique identifier such as a code or integers. The unique identifier is what is used to match reports which improves accuracy and is more efficient for a faster comparison between reports than using text string comparisons.

The following example tables may be stored in a database such as term database or establishment term database. The tables and fields may be used to efficiently, accurately, and quickly determine whether a found report matches a lost report and/or vice versa.

TABLE 1

| Item | Code |
| --- | --- |
| iPhone | 176 |
| iPad | 170 |

TABLE 1-continued

| Item | Code |
| --- | --- |
| Laptop | 171 |
| Charger | 10 |
| Purse | 200 |

TABLE 2

| Model/Brand | Code |
| --- | --- |
| iPhone 5 | 1232 |
| iPhone 6 | 1233 |
| iPad Air Mini | 1000 |
| Samsung | 2250 |
| Coach | 250 |

TABLE 3

| Color | Code |
| --- | --- |
| Red | 101 |
| Black | 102 |
| Green | 103 |
| White | 104 |
| Blue | 105 |

TABLE 4

| Airport | Code |
| --- | --- |
| LAX | 562 |
| SJC | 563 |
| SFO | 564 |
| RNO | 565 |
| LAS | 566 |

TABLE 5

| Material | Code |
| --- | --- |
| Plastic | 302 |
| Metal | 303 |
| Rayon | 304 |
| Cotton | 305 |
| Silicone | 306 |

TABLE 6

| Description | Code |
| --- | --- |
| Cracked | 402 |
| Torn | 403 |
| Wrinkled | 404 |
| Ripped | 405 |
| Broken | 406 |

TABLE 7

| Language | Code |
| --- | --- |
| English | 602 |
| Spanish | 603 |
| Chinese | 604 |
| German | 605 |
| Russian | 606 |

Using similar facts as above, the following is an example table of a lost item report stored in, for example, a lost item database. The unique identifier or codes in each field are based on the input obtained from the customer that lost the item. In other words, once the input is received from the customer that lost the item, a unique identifier or code is associated with the field that is received. For example, when the input for Airport is received as RNO, code 565 may be assigned to the Airport field.

| | |
|---|---|
| Customer Information | Mac McLaughlin |
| | 775.123.4567 |
| | Mac@lostitem.com |
| Lost Date | Aug. 10, 2016 |
| Item Lost | 176, 10 |
| Color | 104, 102 |
| Airport | 565 |
| Model/Brand | 1233 |
| Lost Location | Seat 5C |
| Description of item | 402 screen with puppy screen saver |
| Material | 302 |
| Language code | 603 |
| [language of the report] | |

A person that finds the lost item may then report the lost item by generating a found item report. The found item report maybe inputted into fields, such as on a website, and saved in a database, such as a found item report database. For example, a dropdown menu may list a variety of items that may have been found. The person may select from one of a plurality of the found items. Based on the input provided, the input is matched with a code or integers. The code or integers are what is used to match reports which improves accuracy and is more efficient for a faster comparison between reports than using text string comparisons.

The following is an example of a found report. The codes in each field are based on the input obtained from the person that found the lost item. In other words, once the input is received from the customer that found the item, a unique identifier or code is associated with the field that is received. For example, when the input for Model/Brand is received as iPhone 6, code 1233 maybe assigned to the Airport field.

| | |
|---|---|
| Customer Information | Brian Colodny |
| | 775.765.4321 |
| | Brian@founditem.com |
| Found Date | Aug. 11, 2016 |
| Item Lost | 176, 10 |
| Color | 104, 102 |
| Airport | 565 |
| Model/Brand | 1233 |
| Lost Location | Seat 5C |
| Description of item | 402 screen |
| Material | 302 |
| Language code | 602 |
| [language of the report] | |

When determining whether the lost item report matches a found item report, the unique identifier may then be matched to determine if the lost report matches the found report. This matching process of the codes from each of the lost report and found report is more efficient, accurate, and faster that conducting a text string comparison.

Example 2

For exemplary purposes only and not intended to be limiting, an example scenario is provided. Although described with a specific weighting process, this is not intended to be limiting as other methods and processes may be used to accomplish the same or similar result. For example, different weighting percentages may be used based on data that has been empirically analyzed. In another example, different weighting percentages may be used based on actual successful merges of lost and found item reports.

Using similar facts as above, the following is an example table of a lost item report stored in, for example, a lost item database. The codes in each field are based on the input obtained from a customer that lost the item.

| | | Weighted Percent |
|---|---|---|
| Customer Information | Mac McLaughlin | 0% |
| | 775.123.4567 | |
| | Mac@lostitem.com | |
| Lost Date | Aug. 10, 2016 | 0% |
| Item Lost | 176, 10 | 30% |
| Color | 104, 102 | 5% |
| Airport | 565 | 30% |
| Model/Brand | 1233 | 10% |
| Lost Location | Seat 5C | 10% |
| Description of item | 402 screen with puppy screen saver | 5% |
| Material | 302 | 6% |
| Language code | 603 | 0% |
| Total Weighted Average | | 96% |

The at least one lost item keywords may be iPhone, Charger, RNO, and loss date Aug. 10, 2016.

Similar to the example above, the following is an example of a found report. The codes in each field are based on the input obtained from the person that found the lost item.

| | | Weighted Percent |
|---|---|---|
| Customer Information | Brian Colodny | 0% |
| | 775.765.4321 | |
| | Brian@founditem.com | |
| Found Date | Aug. 15, 2016 | 0% |
| Item Lost | 176, 10 | 30% |
| Color | 104, 104 | 5% |
| Airport | 565 | 30% |
| Model/Brand | 1233 | 10% |
| Lost Location | Seat 5C | 10% |
| Description of item | 402 screen | 5% |
| Material | 302 | 6% |
| Language code | 602 | 0% |
| Total Weighted Average | | 91% |

The at least one found item keywords may be iPhone, Charger, RNO, and found date Aug. 15, 2016.

Found reports having a found date prior to the lost date may be eliminated. Found reports having a found date on or after the lost date are matched with potential lost reports. The at least one lost item keywords may be matched with the at least one found item keywords to determine a match.

Based on the matched keywords, the total weighted average is 96% for the lost report. However, there are five days between the lost date of Aug. 10, 2016 and the found date Aug. 15, 2016. It may be preset to decrease the total weighted average for the found report by 5% for each day after the 4th day. Therefore, the found report may have a total weighted average of 91%.

A predetermined total weighted average may be set at 75%. Therefore, any found reports having a total weighted average above 75% may be presented as a match for the lost report.

The various aspects, features, embodiments or implementations of the invention described above can be used alone or in various combinations. Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment", "an embodiment", "one example" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A system to generate a merged record to facilitate recovery of lost items, comprising:
   a recovery server device configured to:
      receive a first report, the first report pertaining to a lost item and including first report information, the first report information including at least one first descriptive term and a customer identification (ID);
      match the at least one first descriptive term to at least one of a plurality of descriptive terms in a descriptive term list;
      determine if a weighted percentage associated with the matched at least one first descriptive term is greater than a predetermined weighted percent;
      match the at least one first descriptive term to at least one second descriptive term from at least one second report if it is determined that the weighted percentage associated with the matched at least one first descriptive term is greater than the predetermined weighted percent, the second report pertaining to a found item.

2. The system of claim 1, wherein the recovery server device is further configured to:
   initiate display of data associated with the at least one second report if the at least one first descriptive term has been matched to the at least one second descriptive term, the data displayed indicates one or more found items that are potential matches for the lost item.

3. The system of claim 2, further comprising receive a selection of one of the displayed at least one second report.

4. The system of claim 3, further comprising merge the selected second report with the first report.

5. The system of claim 4, further comprising:
   receive an indication to unmerge the selected second report and the first report; and
   restore the first report and the selected second report.

6. The system of claim 1, further comprising initiate display of a match indicator to indicates a percentage of match based on the matched at least one first descriptive term to the at least one second descriptive term from at least one second report.

7. A computer-implemented method for generating a merged report to facilitate recovery of lost items, comprising:
   receiving, at a computing device, a first item report, the first item report including first report information, the first report information including at least one descriptive term and a customer identification;
   accessing a weighted term list including a plurality of descriptive terms, with the plurality of descriptive terms having a weighted value;
   selecting a subset of the plurality of descriptive items from the weighted term list based on the weighted value for the plurality of descriptive items;
   identifying one or more second item reports that potentially match the first item report, the identifying being based on at least in part on the plurality of descriptive items in the subset of the plurality of descriptive items and the weighted value for each of the plurality of descriptive items in the subset of the plurality of descriptive items; and
   subsequently initiating presentation of data associated with the identified one or more second item reports,
   wherein the first item report pertains to a lost item, and wherein the one or more second item reports pertain to found items.

8. A computer-implemented method as recited in claim 7, wherein the method comprises:
   designating the selected one of the identified one or more second item reports as matching the first item report.

9. A computer-implemented method as recited in claim 7, wherein the identifying of the one or more second item reports being further based on a date corresponding to the second item reports as compared to a date corresponding to the first item report.

10. A computer-implemented method as recited in claim 7, wherein the first item report is a lost item report, and wherein the second item reports are found item reports.

11. A computer-implemented method as recited in claim 10, wherein the identifying of the one or more found item reports being further based on a lost date corresponding to the lost item report as compared to a found date corresponding to the found item reports.

12. A computer-implemented method as recited in claim 7, wherein the weighted value for the descriptive items is dependent on a date.

13. A computer-implemented method as recited in claim 7, wherein the weighted value for the descriptive items is based on a date corresponding to the second item reports as compared to a date corresponding to the first item report.

14. A non-transitory computer readable medium including at least computer program code tangibly stored thereon for facilitating recovery of lost items, comprising:
   computer program code for receiving a first item report, the first item report including first report information, the first report information including at least one descriptive term and a customer identification;
   computer program code for accessing a weighted term list including a plurality of descriptive terms, with the plurality of descriptive terms having a weighted value;
   computer program code for selecting a subset of the plurality of descriptive items from the weighted term list based on the weighted value for the plurality of descriptive items;
   computer program code for identifying one or more second item reports that potentially match the first item report, the identifying being based on at least in part on the plurality of descriptive items in the subset of the plurality of descriptive items and the weighted value for each of the plurality of descriptive items in the subset of the plurality of descriptive items; and
   computer program code for initiating presentation of data associated with the identified one or more second item reports,
   wherein the first item report pertains to a lost item, and wherein the one or more second item reports pertain to found items.

15. A non-transitory computer readable medium recited in claim 14, wherein the method comprises:
   designating the selected one of the identified one or more second item reports as matching the first item report.

16. A non-transitory computer readable medium as recited in claim 14, wherein the identifying of the one or more second item reports being further based on a date corresponding to the second item reports as compared to a date corresponding to the first item report.

17. A non-transitory computer readable medium as recited in claim 14, wherein the first item report is a lost item report, and wherein the second item reports are found item reports.

18. A non-transitory computer readable medium as recited in claim 17, wherein the identifying of the one or more found item reports being further based on a lost date corresponding to the lost item report as compared to a found date corresponding to the found item reports.

19. A non-transitory computer readable medium as recited in claim 14, wherein the weighted value for the descriptive items is dependent on a date.

20. A non-transitory computer readable medium as recited in claim 14, wherein the weighted value for the descriptive items is based on a date corresponding to the second item reports as compared to a date corresponding to the first item report.

* * * * *